(12) United States Patent
Torii et al.

(10) Patent No.: US 11,028,906 B2
(45) Date of Patent: Jun. 8, 2021

(54) VEHICLE DRIVE SYSTEM

(71) Applicant: AISIN AW CO., LTD., Anjo (JP)

(72) Inventors: Takeshi Torii, Chiryu (JP); Hiroshi Kato, Kariya (JP); Takuro Iwase, Anjo (JP); Keisuke Nakashima, Anjo (JP); Daisuke Yamaoka, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/645,686

(22) PCT Filed: Nov. 14, 2018

(86) PCT No.: PCT/JP2018/042083
§ 371 (c)(1),
(2) Date: Mar. 9, 2020

(87) PCT Pub. No.: WO2019/098218
PCT Pub. Date: May 23, 2019

(65) Prior Publication Data
US 2020/0278011 A1 Sep. 3, 2020

(30) Foreign Application Priority Data

Nov. 17, 2017 (JP) .............................. JP2017-222311
Mar. 12, 2018 (JP) .............................. JP2018-044453

(51) Int. Cl.
*F16H 3/66* (2006.01)
*B60K 1/00* (2006.01)
(Continued)

(52) U.S. Cl.
CPC ................. *F16H 3/66* (2013.01); *B60K 1/00* (2013.01); *B60K 17/02* (2013.01); *B60K 17/08* (2013.01);
(Continued)

(58) Field of Classification Search
CPC .. F16H 3/66; B60K 1/00; B60K 17/02; F16D 49/08
See application file for complete search history.

(56) References Cited

U.S. PATENT DOCUMENTS

2008/0300093 A1 12/2008 Borgerson
2016/0281839 A1* 9/2016 Torii ....................... F16H 3/663
(Continued)

FOREIGN PATENT DOCUMENTS

JP 2005-030430 A 2/2005
JP 2011-51460 A 3/2011

OTHER PUBLICATIONS

Jan. 8, 2019 International Search Report issued in International Application No. PCT/JP2018/042083.
(Continued)

*Primary Examiner* — Derek D Knight
(74) *Attorney, Agent, or Firm* — Oliff PLC

(57) ABSTRACT

A vehicle drive system including: a rotating electric machine; an output drivingly coupled to a wheel; a differential gear device provided in a power transmission path between the rotating electric machine and the output, the differential gear device including at least a first rotating element drivingly coupled to the rotating electric machine, a second rotating element drivingly coupled to the output, and a third rotating element that is selectively fixed by a one-way clutch to a non-rotating member and that is selectively fixed by a friction brake to the non-rotating member; and a clutch that selectively couples together two of the first rotating element, the second rotating element, and the third rotating element.

20 Claims, 7 Drawing Sheets

(51) Int. Cl.
  *B60K 17/02*   (2006.01)
  *B60K 17/08*   (2006.01)
  *F16D 49/08*   (2006.01)
  *F16D 67/02*   (2006.01)
  *F16H 3/54*    (2006.01)
  *F16H 61/686*  (2006.01)
(52) U.S. Cl.
  CPC ............ *F16D 49/08* (2013.01); *F16D 67/02* (2013.01); *F16H 3/54* (2013.01); *F16H 61/686* (2013.01); *F16H 2200/0021* (2013.01); *F16H 2200/2005* (2013.01); *F16H 2200/2007* (2013.01); *F16H 2200/2035* (2013.01); *F16H 2200/2038* (2013.01); *F16H 2200/2066* (2013.01); *F16H 2200/2082* (2013.01)

(56) References Cited

U.S. PATENT DOCUMENTS

2021/0003196 A1\* 1/2021 Saito .................. F16H 57/0436
2021/0091629 A1\* 3/2021 Iwase ...................... H02K 5/20

OTHER PUBLICATIONS

Jun. 5, 2020 Search Report issued in European Patent Applicaton No. 18879194.1.

\* cited by examiner

[図2]

VEHICLE DRIVE SYSTEM

BACKGROUND

The present disclosure relates to a vehicle drive system.

Vehicle drive systems are known that include an output member drivingly coupled to wheels, and a differential gear device provided in a power transmission path between a rotating electric machine and the output member. One example of such vehicle drive systems is disclosed in Japanese Unexamined Patent Application Publication No. 2011-51460. Reference signs in parentheses shown hereafter in the description of the background art section are those in JP-2011-51460 A.

A vehicle drive control system (1) of JP-2011-51460 A includes an electric motor (5), a differential mechanism (9) drivingly coupled to wheels, and a planetary gear mechanism (7) provided in a power transmission path between the electric motor (7) and the differential mechanism (9). This vehicle drive control system (1) includes a second clutch (13) that is provided between a stationary member (39) and an annulus gear (25). When driving the wheels by using torque of the electric motor (5), the vehicle drive control system (1) engages the second clutch (13) and thus transfers rotation of the electric motor (5) to differential mechanism (9) while reducing the rotational speed by the planetary gear mechanism (7) (paragraphs 0034, 0042). Further, this vehicle drive control system (1) includes a first clutch (11) that is structured with a two-way clutch. On the other hand, when causing the electric motor (5) to generate electric power, the vehicle drive control system (1) disengages the second clutch (13) and engages the first clutch (11), thus creating a situation where shifting by the planetary gear mechanism (7) is not performed (paragraph 0035). That is, the speed ratio of the planetary gear mechanism (7) changes in accordance with the engagement conditions of the clutches (11, 13).

Incidentally, according to JP-2011-51460 A, the second clutch (13) that is engaged when torque of the electric motor (5) is used to move a vehicle is an engagement device that is intermittently controlled by a control device (15) (paragraph 0038). Therefore, to transfer torque of the electric motor (5) to the wheels in order to start the vehicle from a situation where the second clutch (13) is disengaged, control is needed to engage the second clutch (13). This complicates control necessary to start the vehicle. Further, if the second clutch (13) is a hydraulically-driven type, a large transfer torque capacity of the second clutch (13) cannot be secured until the hydraulic pressure becomes sufficiently high. As a result, the second clutch (13) may be unable to transfer a large torque from the electric motor (5) to the wheels when the vehicle starts.

SUMMARY

Therefore, when a vehicle drive system includes a differential gear device that is provided in a power transmission path between a rotating electric machine and an output member and that has speed ratios switchable in accordance with the condition of engagement of an engagement device, it is desired that the vehicle drive system be capable of performing simplified control necessary to start a vehicle using torque of the rotating electric machine and be capable of quickly making the torque from the rotating electric machine transferable to a wheel of the vehicle when the vehicle starts.

A first vehicle drive system according to the present disclosure including: a rotating electric machine; an output drivingly coupled to a wheel; a differential gear device provided in a power transmission path between the rotating electric machine and the output; the differential gear device including at least a first rotating element drivingly coupled to the rotating electric machine, a second rotating element drivingly coupled to the output, and a third rotating element that is selectively fixed by a one-way clutch to a non-rotating member and that is selectively fixed by a friction brake to the non-rotating member; and a clutch that selectively couples together two of the first rotating element, the second rotating element, and the third rotating element, wherein a reaction force torque that acts on the third rotating element when the rotating electric machine outputs a positive torque in a forward powering direction is defined as a first reaction force torque, a reaction force torque that acts on the third rotating element when the rotating electric machine outputs a negative torque opposite in direction to the positive torque is defined as a second reaction force torque, the one-way clutch is structured to be switchable at least between a one-way restriction state in which rotation of the third rotating element in one direction is restricted and a rotation restriction state in which rotation of the third rotating element in both directions is restricted, and in the one-way restriction state, the one-way clutch restricts rotation of the third rotating element in a rotation direction caused by the first reaction force torque while allowing rotation of the third rotating element in a rotation direction caused by the second reaction force torque.

According to this structure, the third rotating element that is being restricted from rotating by the one-way clutch in the one-way restriction state is capable of receiving the first reaction force torque that acts on the third rotating element when the rotating electric machine outputs the positive torque. Thus, it is possible to establish a forward shift speed (hereinafter referred to as a "first shift speed") where rotation input from the rotating electric machine side to the first rotating element is output from the second rotating element to the output side while the rotational speed is changed at a speed ratio determined by a gear ratio of the differential gear device. Further, by engaging the clutch, it is possible to establish a forward shift speed (hereinafter referred to as a "second shift speed") where rotation input from the rotating electric machine side to the first rotating element is output from the second rotating element to the output side at a different rotational speed from a rotational speed when the first shift speed is established. That is, it is possible to selectively establish the first shift speed and the second shift speed, when moving a vehicle forward by transferring the positive torque of the rotating electric machine to the wheel.

In this case, in the second shift speed established by engaging the clutch, the rotation, input from the rotating electric machine side to the first rotating element, can be output from the second rotating element to the output side without changing the rotational speed. Thus, it is possible to appropriately handle large driving force as compared to, for example, a configuration in which the second shift speed is an acceleration speed. Or it is possible to handle higher speed rotation as compared to, for example, a configuration in which the two shift speeds (the first shift speed/the second shift speed) are both deceleration speeds.

It is noted that the one-way clutch in the one-way restriction state is automatically engaged by the first reaction force torque that acts on the third rotating element in accordance with the positive torque of the rotating electric machine. This eliminates the need of performing special control, when starting the vehicle by causing the rotating electric machine to output the positive torque, thus simplifying control. Further, torque from the rotating electric machine becomes transferrable to the wheel at the same time as the one-way clutch in the one-way restriction state is automatically engaged. Thus, it is possible to provide the vehicle drive system that is capable of performing simplified control necessary to start the vehicle using torque of the rotating electric machine and that is capable of quickly making the torque from the rotating electric machine transferable to the wheel when the vehicle starts.

Further, the third rotating element that is being restricted from rotating by the one-way clutch in the rotation restriction state is capable of receiving the second reaction force torque that acts on the third rotating element when the rotating electric machine outputs the negative torque. Thus, by switching the one-way clutch to the rotation restriction state during forward movement in the first shift speed, it is possible to transfer the negative torque output from the rotating electric machine to the wheel, i.e., to cause the rotating electric machine to generate electric power, while leaving the first shift speed established.

Further, since the friction brake that selectively fixes the third rotating element to the non-rotating member is included, it is possible to reduce the rotational speed of the third rotating element against the second reaction force torque by engaging the friction brake and disengaging the clutch from a situation where the rotating electric machine outputs the negative torque to generate electric power in the second shift speed. Further, by bringing the one-way clutch into the rotation restriction state after the rotational speed of the third rotating element becomes zero, it is possible to establish the first shift speed while leaving the rotating electric machine generating electric power. That is, it is possible to make a shift-speed change from the second shift speed to the first shift speed during regenerative movement.

A second vehicle drive system according to the present disclosure including: a rotating electric machine; an output drivingly coupled to a wheel; and a differential gear device provided in a power transmission path between the rotating electric machine and the output, the differential gear device including a first rotating element drivingly coupled to the rotating electric machine, a second rotating element drivingly coupled to the output, a third rotating element that is selectively fixed by a one-way clutch to a non-rotating member and that is selectively fixed by a friction brake to the non-rotating member, and a fourth rotating element that is selectively fixed by a second brake other than the friction brake to the non-rotating member, wherein a reaction force torque that acts on the third rotating element when the rotating electric machine outputs a positive torque in a forward powering direction is defined as a first reaction force torque, a reaction force torque that acts on the third rotating element when the rotating electric machine outputs a negative torque opposite in direction to the positive torque is defined as a second reaction force torque, the one-way clutch is structured to be switchable at least between a one-way restriction state in which rotation of the third rotating element in one direction is restricted and a rotation restriction state in which rotation of the third rotating element in both directions is restricted, and in the one-way restriction state, the one-way clutch restricts rotation of the third rotating element in a rotation direction caused by the first reaction force torque while allowing rotation of the third rotating element in a rotation direction caused by the second reaction force torque.

According to this structure, the third rotating element that is being restricted from rotating by the one-way clutch in the one-way restriction state is capable of receiving the first reaction force torque that acts on the third rotating element when the rotating electric machine outputs the positive torque. Thus, it is possible to establish a forward shift speed (hereinafter referred to as a "first shift speed") where rotation input from the rotating electric machine side to the first rotating element is output from the second rotating element to the output side while the rotational speed is changed at a speed ratio determined by a gear ratio of the differential gear device. Further, by engaging the second brake, it is possible to establish a forward shift speed (hereinafter referred to as a "second shift speed") where rotation input from the rotating electric machine side to the first rotating element is output from the second rotating element to the output side at a different rotational speed from a rotational speed when the first shift speed is established. That is, it is possible to selectively establish the first shift speed and the second shift speed, when moving a vehicle forward by transferring the positive torque of the rotating electric machine to the wheel.

In this case, in the second shift speed established by engaging the second brake, rotation input from the rotating electric machine side to the first rotating element can be output from the second rotating element to the output side while the rotational speed is reduced, for example, to a value that is different from a value when the first shift speed is established. Thus, for example, it is easy to achieve a compact structure where the two shift speeds (the first shift speed/the second shift speed) are both deceleration speeds.

It is noted that the one-way clutch in the one-way restriction state is automatically engaged by the first reaction force torque that acts on the third rotating element in accordance with the positive torque of the rotating electric machine. This eliminates the need of performing special control, when starting the vehicle by causing the rotating electric machine to output the positive torque, thus simplifying control. Further, torque from the rotating electric machine becomes transferrable to the wheel at the same time as the one-way clutch in the one-way restriction state is automatically engaged. Thus, it is possible to provide the vehicle drive system that is capable of performing simplified control necessary to start the vehicle using torque of the rotating electric machine and that is capable of quickly making the torque from the rotating electric machine transferable to the wheel when the vehicle starts.

Further, the third rotating element that is being restricted from rotating by the one-way clutch in the rotation restriction state is capable of receiving the second reaction force torque that acts on the third rotating element when the rotating electric machine outputs the negative torque. Thus, by switching the one-way clutch to the rotation restriction state during forward movement in the first shift speed, it is possible to transfer the negative torque from the rotating electric machine to the wheel, i.e., to cause the rotating electric machine to generate electric power, while leaving the first shift speed established.

Further, since the friction brake that selectively fixes the third rotating element to the non-rotating member is included, it is possible to reduce the rotational speed of the third rotating element against the second reaction force torque by engaging the friction brake and disengaging the second brake from a situation where the rotating electric machine outputs the negative torque to generate electric power in the second shift speed. Further, by bringing the one-way clutch into the rotation restriction state after the rotational speed of the third rotating element becomes zero, it is possible to establish the first shift speed while leaving the rotating electric machine generating electric power. That is, it is possible to make a shift-speed change from the second shift speed to the first shift speed during regenerative movement.

Other features and advantages of the technique according to the present disclosure will be better understood by referring to the following description of illustrative and non-limiting embodiments in conjunction with the drawings.

DETAILED DESCRIPTION OF EMBODIMENTS

First Embodiment

A first embodiment of a vehicle drive system is described with reference to the drawings. In embodiments described below, a first differential gear device 21 corresponds to a "differential gear device", and a case 4 corresponds to a "non-rotating member".

In the description below, "drivingly coupled" refers to a situation where two rotating elements are coupled together such that driving force (synonymous with torque) is transferable therebetween. This includes a situation where the two rotating elements are coupled in such a manner as to rotate together as a unit, or a situation where the two rotating elements are coupled via one or two or more transmission members such that driving force is transferable therebetween. Various types of members that transfer rotation while maintaining or changing the rotational speed are used as the transmission member. Examples of the transmission member include a shaft, a gear mechanism, a belt, and a chain. Other examples of the transmission member may include an engagement device that selectively transfers rotation and driving force, such as a friction engagement device or an intermesh engagement device.

Further, a "rotating electric machine" is used as a concept including a motor (an electric motor), a generator (an alternator), and a motor-generator that serves as either a motor or a generator as needed.

Figure 1:
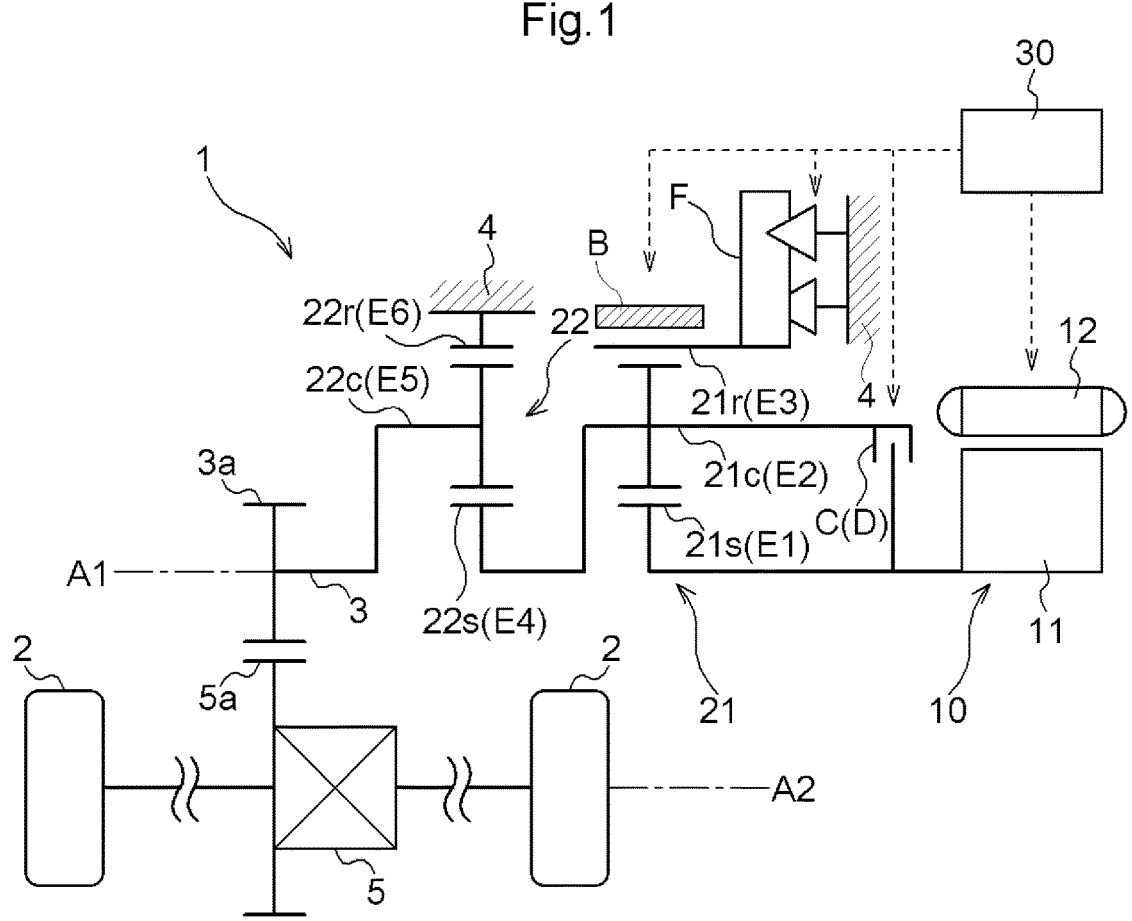
FIG. 1 is a skeleton diagram of a vehicle drive system according to a first embodiment.

As illustrated in FIG. 1, a vehicle drive system 1 includes a rotating electric machine 10, an output member 3 drivingly coupled to wheels 2, and a first differential gear device 21 provided in a power transmission path between the rotating electric machine 10 and the output member 3. The vehicle drive system 1 according to the present embodiment further includes a second differential gear device 22 in a power transmission path between the first differential gear device 21 and the output member 3. Further, the vehicle drive system 1 includes a case 4 that houses both the rotating electric machine 10 and the first differential gear device 21. The second differential gear device 22 and an output differential gear device 5 are also housed in the case 4.

The vehicle drive system 1 includes the rotating electric machine 10 as a source of driving force for the wheels 2 and moves a vehicle by transferring output torque of the rotating electric machine 10 to the wheels 2. Alternatively, the vehicle may include another source of driving force for the wheels 2, such as an internal combustion engine, and the vehicle drive system 1 may move the vehicle by transferring output torque of one or both of the rotating electric machine 10 and the other source of driving force to the wheels 2. The internal combustion engine as used herein is a motor (a gasoline engine, a diesel engine, etc.) that generates power by being driven by the combustion of a fuel in the engine.

The vehicle drive system 1 includes the output differential gear device 5 in a power transmission path between the output member 3 and the right and left two wheels 2. The output differential gear device 5 includes a differential input gear 5a that meshes with an output gear 3a provided to the output member 3. The output differential gear device 5 distributes and transfers, to the right and left two wheels 2, torque input from the output member 3 to the differential input gear 5a. As described above, according to the present embodiment, the rotating electric machine 10 is drivingly coupled to both the right and left two wheels 2 (i.e., the rotating electric machine 10 serves as a source of driving force for the two wheels 2). Alternatively, the vehicle drive system 1 may not include the output differential gear device 5, and the rotating electric machine 10 may be drivingly coupled to only one of the wheels 2.

As illustrated in FIG. 1, the rotating electric machine 10, the output member 3, and the first differential gear device 21 are disposed coaxially with one another (in this example, with respect to a first axis A1). According to the present embodiment, the second differential gear device 22 is also disposed coaxially with respect to the first axis A1. That is, the second differential gear device 22 is provided coaxially with the first differential gear device 21. On the other hand, the output differential gear device 5 is disposed coaxially with respect to a second axis A2 that is parallel to but different from the first axis A1. The first axis A1 and the second axis A2 are imaginary axes. In the example illustrated in FIG. 1, the second differential gear device 22 is disposed on the opposite side of the first differential gear device 21 from the rotating electric machine 10 in an axial direction. Alternatively, the second differential gear device 22 may be disposed between the first differential gear device 21 and the rotating electric machine 10 in the axial direction.

The rotating electric machine 10 includes a stator 12 that is fixed to the case 4, and a rotor 11 that is rotatably supported with respect to the stator 12. The rotating electric machine 10 is electrically connected to an electric storage device (not illustrated), such as a battery or a capacitor. The rotating electric machine 10 performs powering by receiving electric power supplied from the electric storage device or charges the electric storage device by supplying the electric storage device with electric power generated by, for example, the inertia force of the vehicle.

The first differential gear device 21 includes the following: a first rotating element E1 that is drivingly coupled to the rotating electric machine 10; a second rotating element E2 that is drivingly coupled to the output member 3; and a third rotating element E3 that is selectively fixed by a one-way clutch F to the case 4 and that is selectively fixed by a friction brake B to the case 4. The first rotating element E1 is drivingly coupled to the rotating electric machine 10 without the other rotating elements of the first differential gear device 21 or a clutch C interposed therebetween. The second rotating element E2 is drivingly coupled to the output member 3 without the other rotating elements of the first differential gear device 21 or the clutch C interposed therebetween. The first rotating element E1 is coupled to rotate as a unit with the rotating electric machine 10 (the rotor 11). The second rotating element E2 is drivingly coupled to the output member 3 via the second differential gear device 22.

The vehicle drive system 1 includes an engagement device D, in addition to the friction brake B. When the engagement device D is engaged, the first differential gear device 21 is brought into a state different from a state that is created when the third rotating element is fixed. The engagement device D according to the present embodiment is structured with the clutch C, and two of the first rotating element E1, the second rotating element E2, and the third rotating element E3 are selectively coupled together by the clutch C. According to the present embodiment, the clutch C is provided to selectively couple the first rotating element E1 and the second rotating element E2 together. For example, a hydraulic friction engagement device or an electromagnetic friction engagement device may be used as the clutch C.

Figure 2:
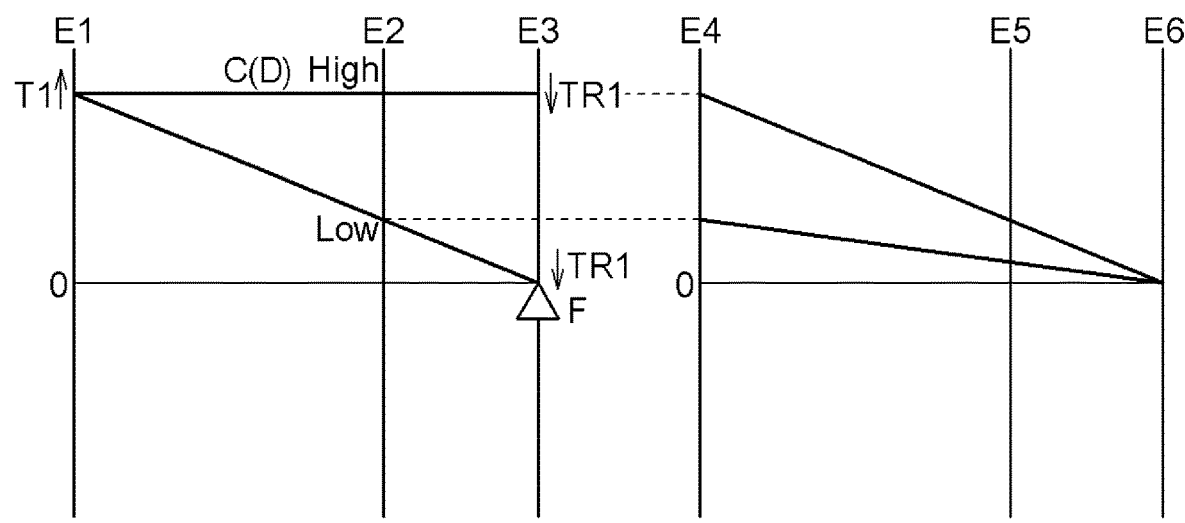
FIG. 2 is a speed diagram for a first differential gear device and a second differential gear device (during forward powering).

The first differential gear device 21 is structured with one planetary gear mechanism and includes only the three rotating elements, namely, the first rotating element E1, the second rotating element E2, and the third rotating element E3. According to the present embodiment, the first differential gear device 21 is structured with a single-pinion-type planetary gear mechanism. A sun gear (a first sun gear 21s), a carrier (a first carrier 21c), and a ring gear (a first ring gear 21r) of the planetary gear mechanism are respectively the first rotating element E1, the second rotating element E2, and the third rotating element E3. Therefore, according to the present embodiment, as illustrated in FIG. 2, the order of rotational speed of the three rotating elements E1 to E3 is as follows: the first rotating element E1, the second rotating element E2, and the third rotating element E3.

The term "order of rotational speed" as used herein refers to the order of rotational speed of the rotating elements that are rotating. Although the rotational speeds of the rotating elements change depending on how the differential gear device is rotating, the order of rotational speed of the rotating elements is determined by the structure of the differential gear device and therefore remains unchanged. The "order of rotational speed of the rotating elements" is the same as the order of arrangement of the rotating elements in a speed diagram (a collinear diagram, refer to FIG. 2). The term "order of arrangement in a speed diagram" as used herein refers to the order in which axes corresponding to the rotating elements are arranged in a direction perpendicular to the axes in the speed diagram (the collinear diagram). Although the direction in which the axes corresponding to the rotating elements are arranged in the speed diagram (the collinear diagram) changes depending on how the speed diagram is drawn, the order of arrangement of the axes is determined by the structure of the differential gear device and therefore remains unchanged.

The second differential gear device 22 includes the following, in the order of rotational speed: a fourth rotating element E4 drivingly coupled to the second rotating element E2; a fifth rotating element E5 drivingly coupled to the output member 3; and a sixth rotating element E6 fixed to the case 4. That is, the second differential gear device 22 is structured as a speed reduction mechanism, reduces, at a speed ratio determined by the gear ratio of the second differential gear device 22, the speed of the rotation which is input from the first differential gear device 21 side to the fourth rotating element E4, and outputs the resultant rotation from the fifth rotating element E5 to the output member 3 side. The fourth rotating element E4 is drivingly coupled to the second rotating element E2 without the other rotating elements of the second differential gear device 22 interposed therebetween. The fifth rotating element E5 is drivingly coupled to the output member 3 without the other rotating elements of the second differential gear device 22 interposed therebetween. The fourth rotating element E4 is coupled to rotate as a unit with the second rotating element E2. The fifth rotating element E5 is coupled to rotate as a unit with the output member 3.

The second differential gear device 22 is structured with one single-pinion-type planetary gear mechanism. A sun gear (a second sun gear 22s), a carrier (a second carrier 22c), and a ring gear (a second ring gear 22r) of the planetary gear mechanism are respectively the fourth rotating element E4, the fifth rotating element E5, and the sixth rotating element E6.

As already described, the third rotating element E3 is selectively fixed by the one-way clutch F to the case 4 and is also selectively fixed by the friction brake B to the case 4. That is, the vehicle drive system 1 includes both the one-way clutch F and the friction brake B to selectively fix the third rotating element E3 to the case 4.

The one-way clutch F is structured to be switchable at least between a one-way restriction state where it restricts rotation of the third rotating element E3 in one direction and a rotation restriction state where it restricts rotation of the third rotating element E3 in both directions. A reaction force torque that acts on the third rotating element E3 when the rotating electric machine 10 outputs a forward torque in a forward powering direction (a torque in a forward acceleration direction for moving the vehicle forward; hereinafter referred to as a "positive torque T1") is defined here as a first reaction force torque TR1 (refer to FIG. 2). The one-way clutch F in the one-way restriction state is structured to restrict rotation of the third rotating element E3 in a direction that is caused by the first reaction force torque TR1. That is, in the one-way restriction state, the one-way clutch F is engaged by the first reaction force torque TR1 that acts on the third rotating element E3 and thus restricts rotation of the third rotating element E3 in one direction (rotation in the direction caused by the first reaction force torque TR1). It is noted that an upward triangle in FIG. 2 represents the one-way clutch F in the one-way restriction state.

On the other hand, a reaction force torque that acts on the third rotating element E3 when the rotating electric machine 10 outputs a reverse torque (a torque, opposite in direction to the forward torque T1 (the positive torque T1), in a forward deceleration direction for braking the vehicle; hereinafter referred to as a "negative torque T2") is defined here as a second reaction force torque TR2 (refer to FIG. 3). The one-way clutch F in the one-way restriction state illustrated in FIG. 2 is structured to allow rotation of the third rotating element E3 in a direction that is caused by the second reaction force torque TR2. That is, in the one-way restriction state, the one-way clutch F is disengaged by the second reaction force torque TR2 that acts on the third rotating element E3. In this way, the one-way clutch F in the one-way restriction state is engaged by the first reaction force torque TR1 that acts on the third rotating element E3 and is disengaged by the second reaction force torque TR2 that acts on the third rotating element E3, thus restricting only rotation of the third rotating element E3 in one direction (rotation in the direction caused by the first reaction force torque TR1).

According to the present embodiment, the first rotating element E1, the second rotating element E2, and the third rotating element E3 are in order of rotational speed. Thus, the first reaction force torque TR1 is opposite in direction to the positive torque T1 as illustrated in FIG. 2, and the second reaction force torque TR2 is opposite in direction to the negative torque T2 as illustrated in FIG. 3. When the direction of rotation of the second rotating element E2 during forward movement of the vehicle is defined as a positive direction (the same applies hereafter), rotation of the third rotating element E3 in a negative direction is restricted by the one-way clutch F in the one-way restriction state, and rotation of the third rotating element E3 in the positive direction is allowed, not restricted by the one-way clutch F in the one-way restriction state.

Figures 3, 4:
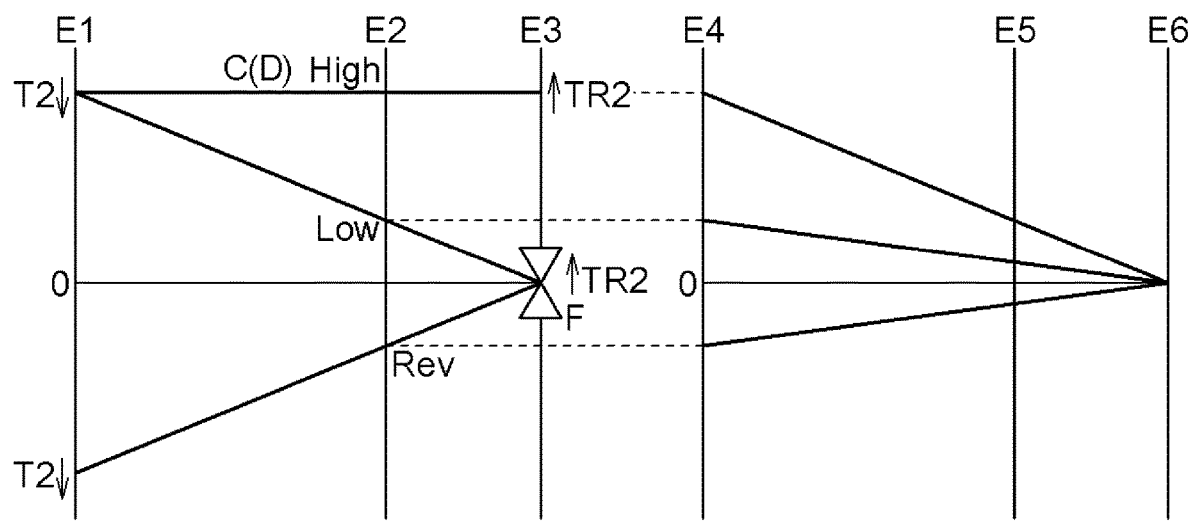
FIG. 3 is a speed diagram for the first differential gear device and the second differential gear device (during forward regenerating/during backward movement).
FIG. 4 is an operation table for the first differential gear device.

On the other hand, in the rotation restriction state illustrated in FIG. 3, the one-way clutch F restricts rotation of the third rotating element E3 in the direction caused by the first reaction force torque TR1 while also restricting rotation of the third rotating element E3 in the direction caused by the second reaction force torque TR2. Thus, the one-way clutch F in the rotation restriction state restricts rotation of the third rotating element E3 in both the positive and negative directions and thereby fixes the third rotating element E3 to the case 4. It is noted that a graphical symbol in FIG. 3 that is a combination of an upward triangle and a downward triangle represents the one-way clutch F in the rotation restriction state.

The one-way clutch F according to the present embodiment is structured to be switchable among the one-way restriction state, the rotation restriction state, an other-direction restriction state where it restricts rotation of the third rotating element E3 in the other direction, and a restriction disabled state where it allows rotation of the third rotating element E3 in both directions. Various types of two-way clutches (selectable two-way clutches) that are switchable between the one-way restriction state, the other-direction restriction state, the rotation restriction state, and the restriction disabled state can be used as the one-way clutch F. That is, the one-way clutch F according to the present embodiment can be structured using part of the function of such a two-way clutch. In the present embodiment, a one-way clutch that utilizes part of the function of such a two-way clutch is also referred to as the "one-way clutch F".

The vehicle drive system 1 includes the one-way clutch F and the clutch C as described above. Thus, as illustrated in FIG. 4, the vehicle drive system 1 is capable of establishing switchable two shift speeds as forward shift speeds that transfer the positive torque T1 of the rotating electric machine 10 to the wheels 2 to move the vehicle forward. It is noted that according to the present embodiment, the friction brake B, which is used to selectively fix the third rotating element E3 to the case 4, is not engaged for the purpose of establishing (maintaining) shift speeds. The reason for providing the friction brake B is described later.

The vehicle drive system 1 is capable of establishing a low speed (Low) and a high speed (High) as the two shift speeds. The low speed (Low) is a shift speed (deceleration speed) at which rotation in the positive direction input from the rotating electric machine 10 side to the first rotating element E1 is output from the second rotating element E2 to the output member 3 side while the rotational speed is reduced at a speed ratio determined by the gear ratio of the first differential gear device 21. The high speed (High) is a shift speed (direct coupling speed) at which rotation in the positive direction input from the rotating electric machine 10 side to the first rotating element E1 is output from the second rotating element E2 to the output member 3 side while the rotational speed is maintained.

The vehicle drive system 1 is also capable of establishing a reverse shift speed (a reverse speed; Rev) that transfers the negative torque T2 of the rotating electric machine 10 to the wheels 2 to move the vehicle backward. The reverse speed (Rev) is a shift speed at which rotation in the negative direction input from the rotating electric machine 10 side to the first rotating element E1 is output from the second rotating element E2 to the output member 3 side while the rotational speed is reduced at a speed ratio determined by the gear ratio of the first differential gear device 21.

In an operation table of FIG. 4, a triangular symbol used in connection with the one-way clutch F represents that it is in the one-way restriction state, a circular symbol used in connection with the one-way clutch F represents that it is in the rotation restriction state, and no symbol used in connection with the one-way clutch F represents that it is in the one-way restriction state or in the restriction disabled state. On the other hand, a circular symbol used in connection with the clutch C represents that it is engaged, and no symbol used in connection with the clutch C represents that it is disengaged. Further, "M" represents that the rotating electric machine 10 outputs the positive torque T1 (in a powering state), and "G" represents that the rotating electric machine 10 outputs the negative torque T2 (in a regenerating state).

As illustrated in FIG. 4, the low speed (Low) is established by bringing, with the clutch C disengaged, the one-way clutch F into the one-way restriction state or the rotation restriction state in accordance with the torque output condition of the rotating electric machine 10. The low speed (M-Low) during forward powering is established by bringing, with the clutch C disengaged, the one-way clutch F into the one-way restriction state. As illustrated in FIG. 2, the third rotating element E3 that is being restricted from rotating by the one-way clutch F in the one-way restriction state is capable of receiving the first reaction force torque TR1, which acts on the third rotating element E3 when the rotating electric machine 10 outputs the positive torque T1. This makes it possible that rotation in the positive direction input from the rotating electric machine 10 side to the first rotating element E1 is output from the second rotating element E2 to the output member 3 side while the rotational speed is reduced at a speed ratio determined by the gear ratio of the first differential gear device 21.

On the other hand, the low speed (G-Low) during forward regenerating is established by bringing, with the clutch C disengaged, the one-way clutch F into the rotation restriction state. As illustrated in FIG. 3, the third rotating element E3 that is being restricted from rotating by the one-way clutch F in the rotation restriction state is capable of receiving the second reaction force torque TR2, which acts on the third rotating element E3 when the rotating electric machine 10 outputs the negative torque T2. If the one-way clutch F is brought into the one-way restriction state as in the low speed (M-Low) during forward powering, the one-way clutch F is disengaged by the second reaction force torque TR2 that acts on the third rotating element E3, so that the low speed (G-Low) cannot be established properly. For this reason, the one-way clutch F is brought into the rotation restriction state to make it possible to property establish the low speed (G-Low) during forward regenerating.

As illustrated in FIG. 4, regardless of the torque output condition of the rotating electric machine 10 (in other words, both during forward powering and during forward regenerating), the high speed (High) is established by engaging the clutch C with the one-way clutch F in the one-way restriction state or in the restriction disabled state. Engaging the clutch C allows all the rotating elements of the first differential gear device 21 to rotate together as a unit at the same speed (i.e., prohibits differential rotation of the first differential gear device 21). Thus, as illustrated in FIG. 2 and FIG. 3, rotation in the positive direction input from the rotating electric machine 10 side to the first rotating element E1 can be output from the second rotating element E2 to the output member 3 side while the rotational speed is maintained.

As illustrated in FIG. 4, the reverse speed (Rev) is established by bringing the one-way clutch F into the rotation restriction state with the clutch C being disengaged. As illustrated in FIG. 3, the third rotating element E3 that is being restricted from rotating by the one-way clutch F in the rotation restriction state is capable of receiving the second reaction force torque TR2, which acts on the third rotating element E3 when the rotating electric machine 10 outputs the negative torque T2. This makes it possible that rotation in the negative direction input from the rotating electric machine 10 side to the first rotating element E1 is output from the second rotating element E2 to the output member 3 side while the rotational speed is reduced at a speed ratio determined by the gear ratio of the first differential gear device 21.

As illustrated in FIG. 1, the vehicle drive system 1 includes a control device 30 that controls the engagement of the clutch C and the switching of the one-way clutch F between the one-way restriction state and the rotation restriction state. The control device 30 also controls the engagement of the friction brake B and the driving of the rotating electric machine 10. The control device 30 includes a computational processing unit, such as a central processing unit (CPU), as the core member and also includes a storage device accessible by the computational processing unit, such as a random access memory (RAM) or a read only memory (ROM). Functions of the control device 30 are implemented by software (a program) stored in the storage device, such as a ROM, by additional hardware, such as a computation circuit, or by both of them. The control device 30 may be structured as a combination of multiple hardware elements (multiple separate hardware elements) that are communicable with each other.

The control device 30 is structured to be capable of obtaining information (sensor detection information) about the results of detection made by various types of sensors mounted on the vehicle. Examples of the sensor detection information may include information on accelerator operation amount, information on the vehicle speed, and information on the state of change or the amount of charge in an electric storage device that supplies electric power to the rotating electric machine 10. On the basis of the sensor detection information by, for example, referring to a control mapping table, the control device 30 determines a target shift speed to be established by the first differential gear device 21 and a target torque for the rotating electric machine 10. Although not described in detail here, the target shift speed is normally determined to be the low speed (Low) in a low vehicle-speed range, and is normally determined to be the high speed (High) in a high vehicle-speed range. The control device 30 controls the engagement of the clutch C and the switching of the one-way clutch F such that the determined target shift speed is established.

For example, the control device 30 controls actuation of an actuator, such as a hydraulic actuator, an electric actuator, or an electromagnetic actuator and thereby controls the engagement of the clutch C and the switching of the one-way clutch F. Further, the control device 30 controls the rotating electric machine 10 such that the determined target torque is output. Although not described in detail here, the control device 30 controls the driving of the rotating electric machine 10 by controlling an inverter device that converts direct-current voltage of the electric storage device to alternating-current voltage and then supplies the voltage to the rotating electric machine 10.

For example, to run the vehicle in the low speed (Low), the control device 30 disengages the clutch C and brings the one-way clutch F into the one-way restriction state. The one-way clutch F in the one-way restriction state is automatically engaged by the first reaction force torque TR1, which acts on the third rotating element E3 in accordance with the positive torque T1 of the rotating electric machine 10. This eliminates the need of performing special control, when starting the vehicle by causing the rotating electric machine 10 to output the positive torque T1, thus simplifying control. Further, torque from the rotating electric machine 10 becomes transferable to the wheels 2 at the same time as the one-way clutch F in the one-way restriction state is automatically engaged. Thus, control necessary to start the vehicle using torque of the rotating electric machine 10 can be simplified, and also the torque from the rotating electric machine 10 quickly becomes transferable to the wheels 2 when the vehicle starts. This makes it easier to take advantage of the feature of the rotating electric machine 10 that is capable of outputting relatively large torque from zero rotation.

Further, for example, if the vehicle speed gradually decreases to the low vehicle-speed range during forward powering in the vehicle-speed range, the target shift speed may change from the high speed (High) to the low speed (Low) in the control device 30. In this case, the control device 30 brings the one-way clutch F into the one-way restriction state and disengages the clutch C that has been engaged to establish the high speed (High). As a result, differential rotation of the first differential gear device 21 is allowed, and also the rotational speed of the third rotating element E3 gradually decreases due to the first reaction force torque TR1, which acts on the third rotating element E3 in accordance with the positive torque T1 of the rotating electric machine 10. When the rotational speed of the third rotating element E3 eventually becomes zero, the one-way clutch F in the one-way restriction state is automatically engaged, so that the low speed (Low) is established again. In this way, during forward powering, a shift-speed change from the high speed (High) to the low speed (Low) can be performed semi-automatically by simple control that just brings the one-way clutch F into the one-way restriction state while disengaging the clutch C.

Likewise, for example, if the vehicle speed gradually decreases to the low vehicle-speed range during forward regenerating in the high vehicle-speed range, the target shift speed may change from the high speed (High) to the low speed (Low) in the control device 30. However, the one-way clutch F cannot be engaged automatically unlike during forward powering, because the second reaction force torque TR2, which acts during forward regenerating on the third rotating element E3 in accordance with the negative torque T2 of the rotating electric machine 10, acts to increase the rotational speed of the third rotating element E3. For this reason, the vehicle drive system 1 includes, as means for selectively fixing the third rotating element E3 to the case 4, the friction brake B in addition to the one-way clutch F.

The friction brake B is a brake (a braking device) that utilizes frictional force between objects. Various types of brakes can be used as the friction brake B, including the following: a disc brake (single-plate/multi-plate) that generates a braking force by sandwiching and squeezing a brake disc between friction materials; a drum brake that generates a braking force by pressing a brake shoe against a cylindrical drum; and a band brake that generates a braking force by tightening a band of friction material around the outer periphery of a cylindrical drum. Of all these, it is preferable to use a drum brake or a band brake because a self-servo effect (self-energizing effect) is expectable. According to the present embodiment, the friction brake B is structured with a band brake, which is capable of being installed for the first differential gear device 21 as a planetary gear mechanism while hardly increasing the device size. For example, the friction brake B may be a hydraulically-actuated type or an electromagnetically-actuated type.

Figure 5:
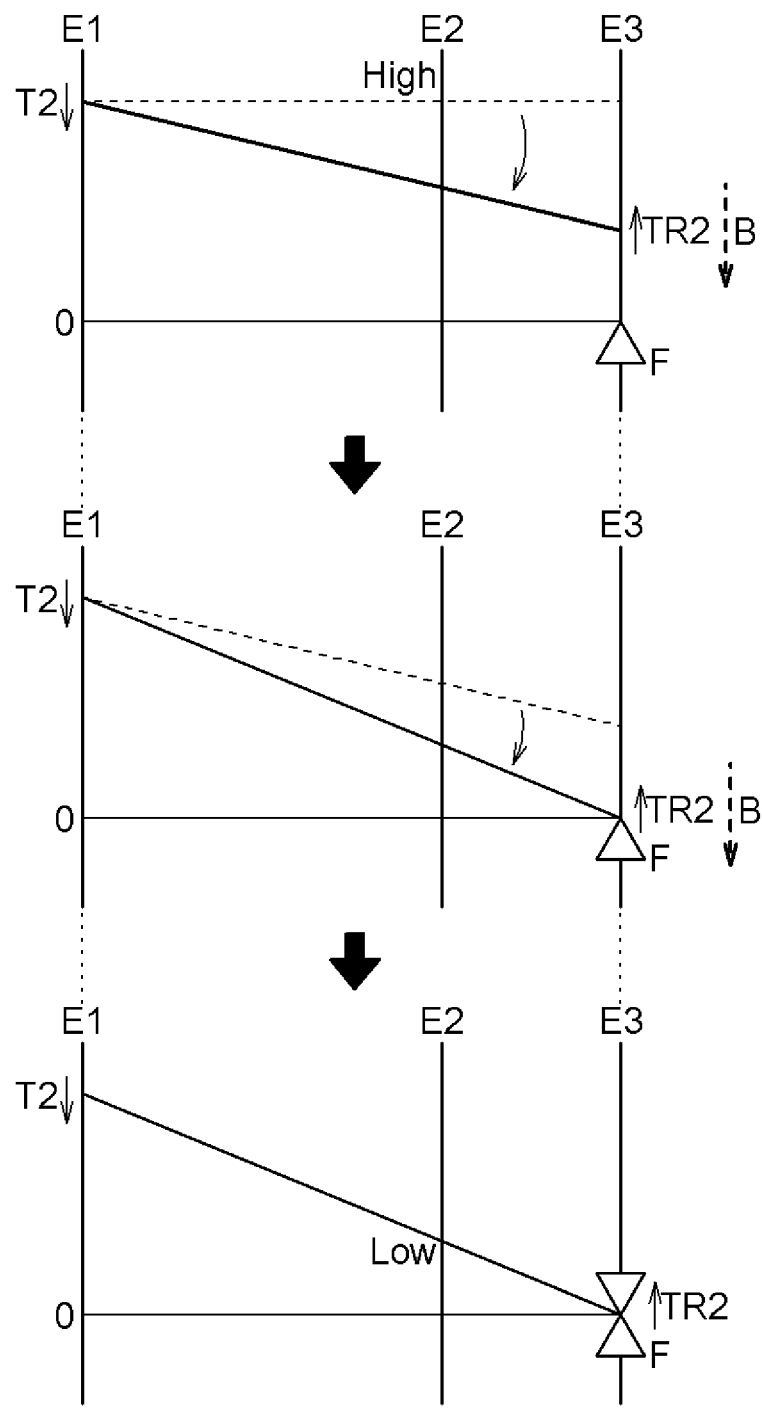
FIG. 5 is an explanatory diagram illustrating shifting from high speed to low speed during forward regenerating.

Bringing the friction brake B into slip engagement allows a gradual decrease in the rotational speed of the third rotating element E3 as illustrated in the upper part of FIG. 5, even when the second reaction force torque TR2 in the positive direction acts during forward regenerating on the third rotating element E3 in accordance with the negative torque T2 of the rotating electric machine 10. The "slip engagement" used herein means that engagement members (e.g., in the case of a band brake, a cylindrical drum and a band of friction material) of the friction brake B are engaged to transfer torque therebetween while rotating at different speeds. According to the present embodiment, the friction brake B is structured with a band brake and is provided in such a manner as to produce a self-servo effect in a direction that reduces the speed of rotation of the third rotating element E3 in the positive direction (in a forward direction). This helps the band of friction material to be brought in contact with and pressed against the cylindrical drum by a frictional force generated at the band brake as the friction brake B. Thus, it is possible to appropriately reduce the rotational speed of the third rotating element E3 using the friction brake B that is relatively small in size.

As the engagement of the friction brake B becomes tighter, the rotational speed of the third rotating element E3 eventually decreases to zero (the middle part of FIG. 5). Under this condition, where the rotational speed of the third rotating element E3 is zero, the control device 30 brings the one-way clutch F that has been brought into the one-way restriction state to establish the high speed (High), into the rotation restriction state (the lower part of FIG. 5). As described above, from a situation where the rotating electric machine 10 outputs the negative torque T2 with the clutch C engaged, the control device 30 brings the friction brake B into slip engagement while disengaging the clutch C so as to reduce the rotational speed of the third rotating element E3, and brings the one-way clutch F into the rotation restriction state when the rotational speed of the third rotating element E3 becomes zero. In this way, also during forward regenerating, control is performed to disengage the clutch C, to engage the friction brake B, and to switch the one-way clutch F from the one-way restriction state to the rotation restriction state, thereby making a shift-speed change from the high speed (High) to the low speed (Low).

The situation just after the change to the low speed (G-Low) during forward regenerating is such that the friction brake B is engaged and that the one-way clutch F is in the rotation restriction state. According to the present embodiment, after establishing the low speed (G-Low) by bringing the one-way clutch F into the rotation restriction state during forward regenerating, the control device 30 maintains the rotation restriction state during the time that the rotating electric machine 10 outputs the negative torque T2 (i.e., during the time that the forward regenerating continues). The control device 30 may disengage the friction brake B after bringing the one-way clutch F into the rotation restriction state. As described above, the friction brake B according to the present embodiment is engaged basically only to change the shift speed from the high speed (High) to the low speed (Low) during forward regenerating, and is not engaged for the purpose of maintaining the established low speed (Low). This allows the maximum holding torque from the friction brake B to be less than the maximum holding torque from the one-way clutch F, and therefore the friction brake B can be relatively small in size. Further, if the friction brake B is a normally-open type, it is unnecessary to drive an actuator of the friction brake B except when making a shift-speed change, and therefore energy efficiency of the vehicle drive system 1 is improvable.

Second Embodiment

A second embodiment of the vehicle drive system is described with reference to the drawings. The present embodiment differs from the first embodiment in the specific structure of a speed change mechanism that is structured on the basis of the first differential gear device 21 and the second differential gear device 22. A vehicle drive system 1 according to the present embodiment is described below with focus on the difference from the first embodiment. Unless otherwise specified, the same features as those in the first embodiment are denoted by the same references and will not be described in detail again.

Figure 6:
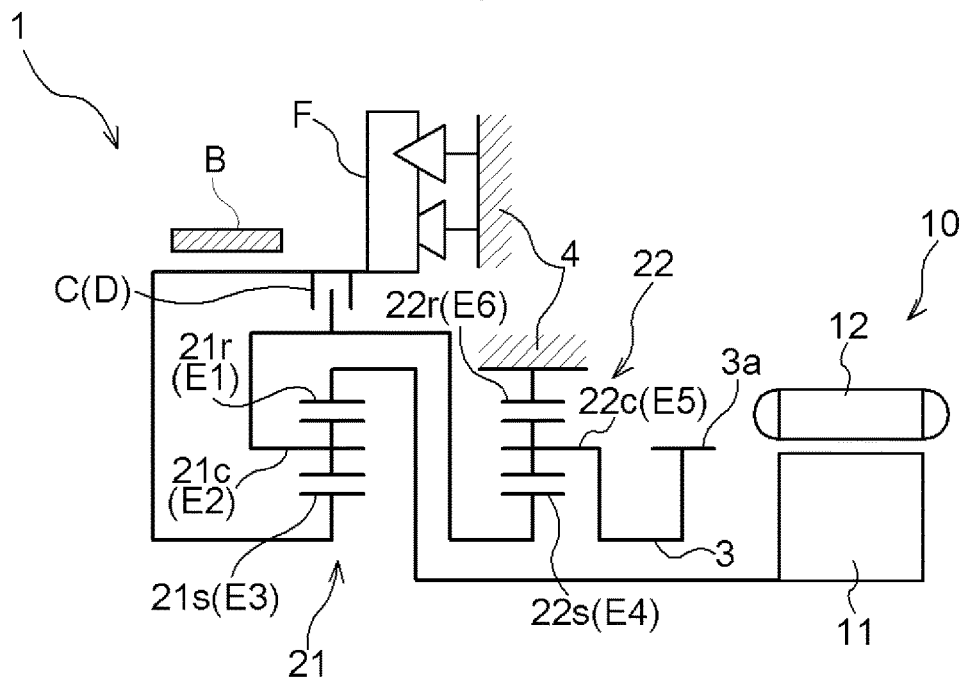
FIG. 6 is a skeleton diagram of a vehicle drive system according to a second embodiment.
Figure 7:
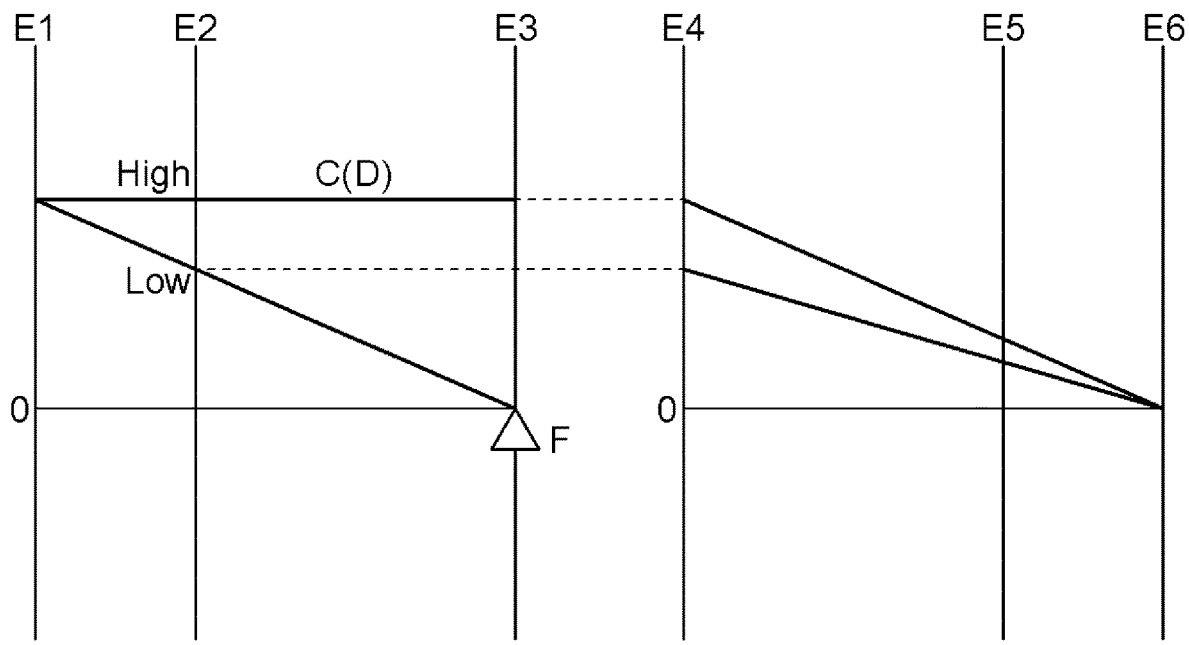
FIG. 7 is a speed diagram for a first differential gear device and a second differential gear device.

As illustrated in FIG. 6, a first differential gear device 21 according to the present embodiment is also structured with a single-pinion-type planetary gear mechanism including only three rotating elements, namely, a first rotating element E1, a second rotating element E2, and a third rotating element E3. According to the present embodiment, a ring gear (a first ring gear 21r), a carrier (a first carrier 21c), and a sun gear (a first sun gear 21s) of the planetary gear mechanism are respectively the first rotating element E1, the second rotating element E2, and the third rotating element E3. As illustrated in FIG. 7, the order of rotational speed of these three rotating elements E1 to E3 is the first rotating element E1, the second rotating element E2, then the third rotating element E3.

A second differential gear device 22 according to the present embodiment is also structured with a single-pinion-type planetary gear mechanism including only three rotating elements, namely, a fourth rotating element E4, a fifth rotating element E5, and a sixth rotating element E6. A sun gear (a second sun gear 22s), a carrier (a second carrier 22c), and a ring gear (a second ring gear 22r) of the planetary gear mechanism are respectively the fourth rotating element E4, the fifth rotating element E5, and the sixth rotating element E6. As illustrated in FIG. 7, the order of rotational speed of these three rotating elements E4 to E6 is the fourth rotating element E4, the fifth rotating element E5, then the sixth rotating element E6. It is noted that FIG. 7 illustrates a speed diagram for the first differential gear device 21 and the second differential gear device 22 during forward powering.

The second differential gear device 22 is disposed between the rotating electric machine 10 and the first differential gear device 21 in an axial direction. That is, the rotating electric machine 10, the second differential gear device 22, and the first differential gear device 21 are arranged in this order in the axial direction. Further, an output member 3 having an output gear 3a is disposed between the rotating electric machine 10 and the second differential gear device 22 in the axial direction.

The vehicle drive system 1 includes a clutch C as an engagement device D, in addition to the friction brake B. The engagement device D according to the present embodiment is provided to selectively couple together the second rotating element E2 (the first carrier 21c) and the third rotating element E3 (the first sun gear 21s) of the first differential gear device 21.

The vehicle drive system 1 structured in this way has the same effects as the first embodiment. That is, control necessary to start the vehicle using torque of the rotating electric machine 10 can be simplified, and also the torque from the rotating electric machine 10 quickly becomes transferable to the wheels 2 when the vehicle starts. Further, during forward powering, a shift-speed change from the high speed (High) to the low speed (Low) can be performed semi-automatically by simple control that just brings the one-way clutch F into the one-way restriction state while disengaging the clutch C. Furthermore, also during forward regenerating, a shift-speed change from the high speed (High) to the low speed (Low) can be made by performing control to disengage the clutch C, to engage the friction brake B, and to switch the one-way clutch F from the one-way restriction state to the rotation restriction state. In addition, since it is unnecessary to drive an actuator of the friction brake B except when making a shift-speed change, energy efficiency of the vehicle drive system 1 is improvable.

Third Embodiment

A third embodiment of the vehicle drive system is described with reference to the drawings. The present embodiment differs from the first embodiment in the specific structure of a speed change mechanism. A vehicle drive system 1 according to the present embodiment is described below with focus on the difference from the first embodiment. Unless otherwise specified, the same features as those in the first embodiment are denoted by the same references and will not be described in detail again.

Figure 8:
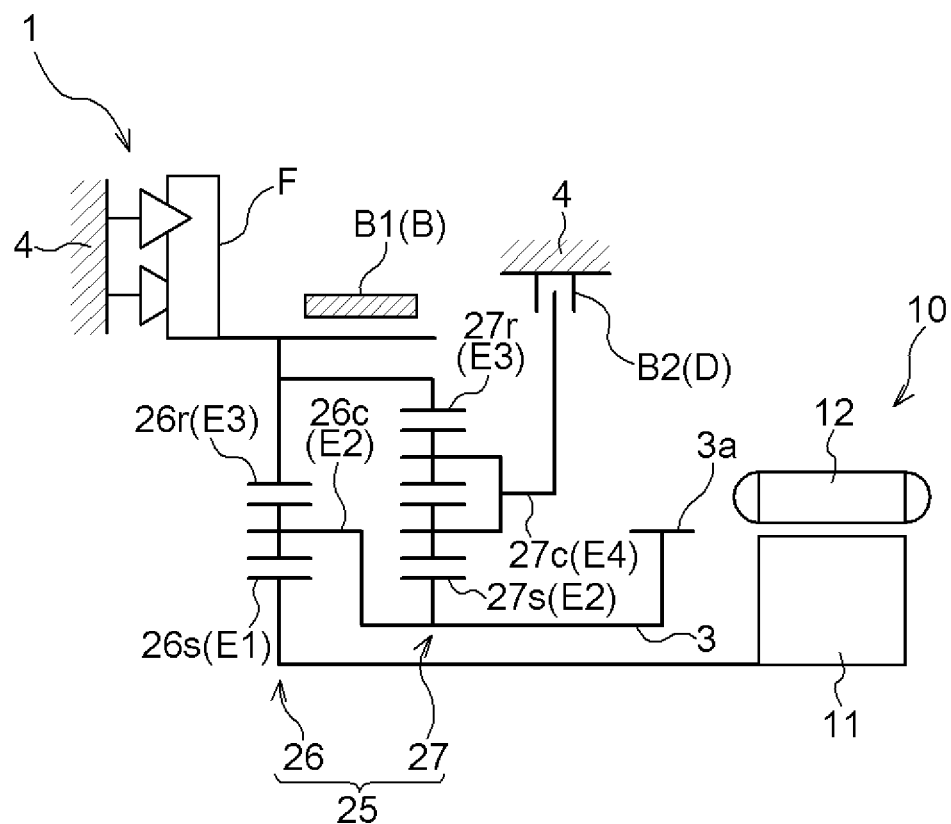
FIG. 8 is a skeleton diagram of a vehicle drive system according to a third embodiment.

As illustrated in FIG. 8, the vehicle drive system 1 according to the present embodiment includes a differential gear device 25 including four rotating elements, namely, a first rotating element E1, a second rotating element E2, a third rotating element E3, and a fourth rotating element E4. The vehicle drive system 1 includes, in addition to a first brake B1 as a friction brake B, a second brake B2 as an engagement device D.

The first rotating element E1 of the differential gear device 25 is drivingly coupled to a rotating electric machine 10. The second rotating element E2 is drivingly coupled to an output member 3. The third rotating element E3 is selectively fixed by a one-way clutch F to a case 4 and is also selectively fixed by the first brake B1 (the friction brake B) to the case 4. The fourth rotating element E4 is selectively fixed to the case 4 by the second brake B2 (the engagement device D).

The differential gear device 25 according to the present embodiment is structured as a combination device made by combining a first planetary gear mechanism 26 and a second planetary gear mechanism 27. The first planetary gear mechanism 26 is a single-pinion-type planetary gear mechanism and includes a first sun gear 26s, a first carrier 26c, and a first ring gear 26r. The second planetary gear mechanism 27 is a double-pinion-type planetary gear mechanism and includes a second sun gear 27s, a second carrier 27c, and a second ring gear 27r.

The first sun gear 26s of the first planetary gear mechanism 26 is drivingly coupled to the rotating electric machine 10. Further, the first carrier 26c of the first planetary gear mechanism 26 and the second sun gear 27s of the second planetary gear mechanism 27 are coupled together to rotate as a unit with each other and are drivingly coupled to the output member 3. Further, the first ring gear 26r of the first planetary gear mechanism 26 and the second ring gear 27r of the second planetary gear mechanism 27 are coupled together to rotate as a unit with each other and are selectively fixed by the one-way clutch F or the first brake B1 (the friction brake B) to the case 4. Further, the second carrier 27c of the second planetary gear mechanism 27 is selectively fixed by the second brake B2 (the engagement device D) to the case 4.

Figure 9:
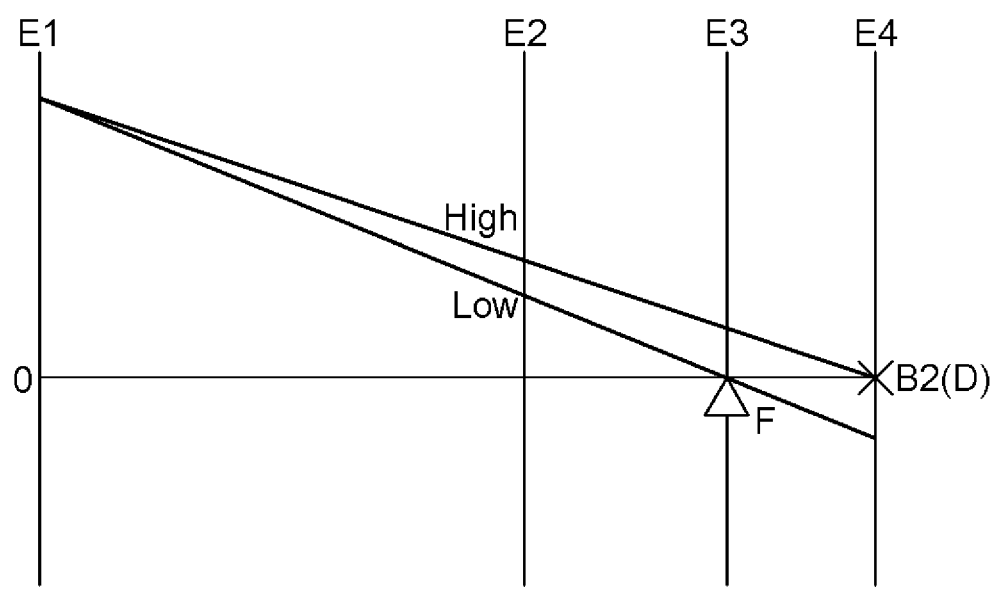
FIG. 9 is a speed diagram for a first differential gear device and a second differential gear device.

According to the present embodiment, the first sun gear 26s serves as the first rotating element E1, the first carrier 26c and the second sun gear 27s that rotate as a unit with each other serve as the second rotating element E2, the first ring gear 26r and the second ring gear 27r that rotate as a unit with each other serve as the third rotating element E3, and the second carrier 27c serves as the fourth rotating element E4. As illustrated in FIG. 9, the order of rotational speed of the four rotating elements E1 to E4 is the first rotating element E1, the second rotating element E2, the third rotating element E3, then the fourth rotating element E4. It is noted that FIG. 9 illustrates a speed diagram for the differential gear device 25 during forward powering.

The vehicle drive system 1 according to the present embodiment is also capable of establishing two shift speeds, namely, a low speed (Low) and a high speed (High). The low speed (Low) according to the present embodiment is a shift speed (first deceleration speed) at which rotation in the positive direction input from the rotating electric machine 10 side to the first rotating element E1 is output from the second rotating element E2 to the output member 3 side while the rotational speed is reduced at a first speed reduction ratio. The high speed (High) is a shift speed (second deceleration speed) at which rotation in the positive direction input from the rotating electric machine 10 side to the first rotating element E1 is output from the second rotating element E2 to the output member 3 side while the rotational speed is reduced at a second speed reduction ratio less than the first speed reduction ratio. Thus, according to the present embodiment, as the two shift speeds, there are two switchable deceleration speeds with different speed reduction ratios.

The low speed (Low) during forward powering is established by bringing, with the second brake B2 disengaged, the one-way clutch F into the one-way restriction state (refer to FIG. 9). With the third rotating element E3 being fixed to the case 4 by the one-way clutch F in the one-way restriction state, rotation in the positive direction input from the rotating electric machine 10 side to the first rotating element E1 can be output from the second rotating element E2 to the output member 3 side while the rotational speed is reduced at the first speed reduction ratio determined by the gear ratio of the first planetary gear mechanism 26. Further, the low speed (Low) during forward regenerating is established by bringing, with the second brake B2 disengaged, the one-way clutch F into the rotation restriction state.

Further, the high speed (High) during forward powering and during forward regenerating is established by engaging the second brake B2 with the first brake B1 disengaged (refer to FIG. 9). Then, with the fourth rotating element E4 being fixed to the case 4 by the engaged second brake B2, rotation in the positive direction input from the rotating electric machine 10 side to the first rotating element E1 can be output from the second rotating element E2 to the output member 3 side while the rotational speed is reduced at the second speed reduction ratio (<the first speed reduction ratio) determined by the gear ratios of both the first planetary gear mechanism 26 and the second planetary gear mechanism 27.

Figure 10:
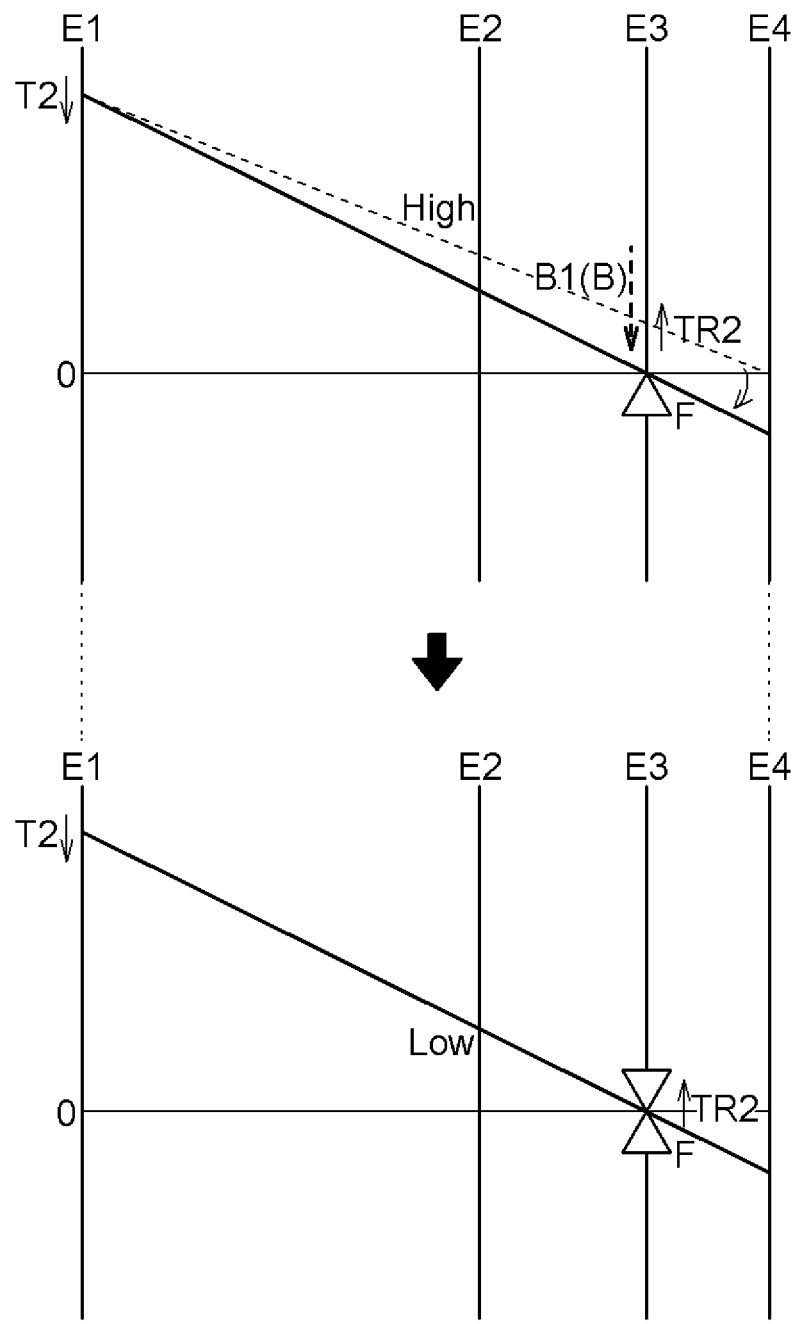
FIG. 10 is an explanatory diagram illustrating shifting from high speed to low speed during forward regenerating.

The vehicle drive system 1 according to the present embodiment also has the same effects as the first embodiment. That is, control necessary to start the vehicle using torque of the rotating electric machine 10 can be simplified, and also the torque from the rotating electric machine 10 quickly becomes transferable to the wheels 2 when the vehicle starts. Further, during forward powering, a shift-speed change from the high speed (High) to the low speed (Low) can be performed semi-automatically by simple control that just brings the one-way clutch F into the one-way restriction state while disengaging the second brake B2. Furthermore, also during forward regenerating, a shift-speed change from the high speed (High) to the low speed (Low) can be made by performing control to disengage the second brake B2, to engage the first brake B1, and to switch the one-way clutch F from the one-way restriction state to the rotation restriction state (refer to FIG. 10). In addition, since it is unnecessary to drive an actuator of the friction brake B except when making a shift-speed change, energy efficiency of the vehicle drive system 1 is improvable.

Moreover, according to the present embodiment, since the two switchable shift speeds (Low/High) are two deceleration speeds having different speed reduction ratios, it is possible to handle larger torque using the rotating electric machine 10 that is small in size. Further, also when the high speed (High) is established, rotation in the positive direction input from the rotating electric machine 10 side to the first rotating element E1 is transferred to each of the rotating elements E2 to E4 while the rotational speed is reduced. Thus, it is possible to keep down the maximum rotational speed of the third rotating element E3 to be fixed by the first brake B1 or the one-way clutch F.

OTHER EMBODIMENTS (1) According to the example structure described in the above embodiments, part of the function of a two-way clutch is used as the one-way clutch F. However, the embodiments are not limited to this structure, and a special-purpose one-way clutch (a selectable one-way clutch) switchable between the one-way restriction state and the rotation restriction state may be used as the one-way clutch F.

(2) According to the example structure described in the first embodiment and the second embodiment, the order of rotational speed of the three rotating elements E1 to E3 of the first differential gear device 21 is the first rotating element E1, the second rotating element E2, and the third rotating element E3. However, the embodiments are not limited to this structure, and the order of rotational speed of the three rotating elements E1 to E3 may be the first rotating element E1, the third rotating element E3, and the second rotating element E2. This structure can be achieved by structuring the first differential gear device 21 with a double-pinion-type planetary gear mechanism.

(3) According to the example structure described in the third embodiment, the order of rotational speed of the four rotating elements E1 to E4 of the differential gear device 25 is the first rotating element E1, the second rotating element E2, the third rotating element E3, and the fourth rotating element E4. However, the embodiment is not limited to this structure, and the order of rotational speed of the four rotating elements E1 to E4 may be the first rotating element E1, the second rotating element E2, the fourth rotating element E4, and the third rotating element E3.

(4) According to the example structure described in the embodiments, the output member 3 is coupled to the output differential gear device 5, specifically, the output gear 3a meshes with the differential input gear 5a. However, the embodiments are not limited to this structure, and, for example, a counter gear mechanism may be provided in a power transmission path between the output member 3 and the output differential gear device 5, and torque may be transferred from the output member 3 to the output differential gear device 5 via the counter gear mechanism.

(5) According to the example structure described in the first embodiment and the second embodiment, the second differential gear device 22 is provided in the power transmission path between the first differential gear device 21 and the output member 3. However, the embodiments are not limited to this structure, and the second differential gear device 22 may not be provided in the power transmission path between the first differential gear device 21 and the output member 3. Alternatively, in addition to the second differential gear device 22, at least one other differential gear device or other type of speed reduction device may be provided in the power transmission path between the first differential gear device 21 and the output member 3.

(6) According to the example structure described in the first embodiment and the second embodiment, the second differential gear device 22 is disposed coaxially with the first differential gear device 21. However, the embodiments are not limited to this structure, and the second differential gear device 22 may be disposed non-coaxially with the first differential gear device 21. Further, according to the example structure described in the embodiments, the output differential gear device 5 is disposed non-coaxially with the first differential gear device 21 (or the differential gear device 25). However, the output differential gear device 5 may be disposed coaxially with the first differential gear device 21 or the other. Further, according to the example structure described in the embodiments, the rotating electric machine 10 is provided coaxially with the first differential gear device 21 (or the differential gear device 25). However, the rotating electric machine 10 may be disposed non-coaxially with the first differential gear device 21 or the other.

Figure 11:
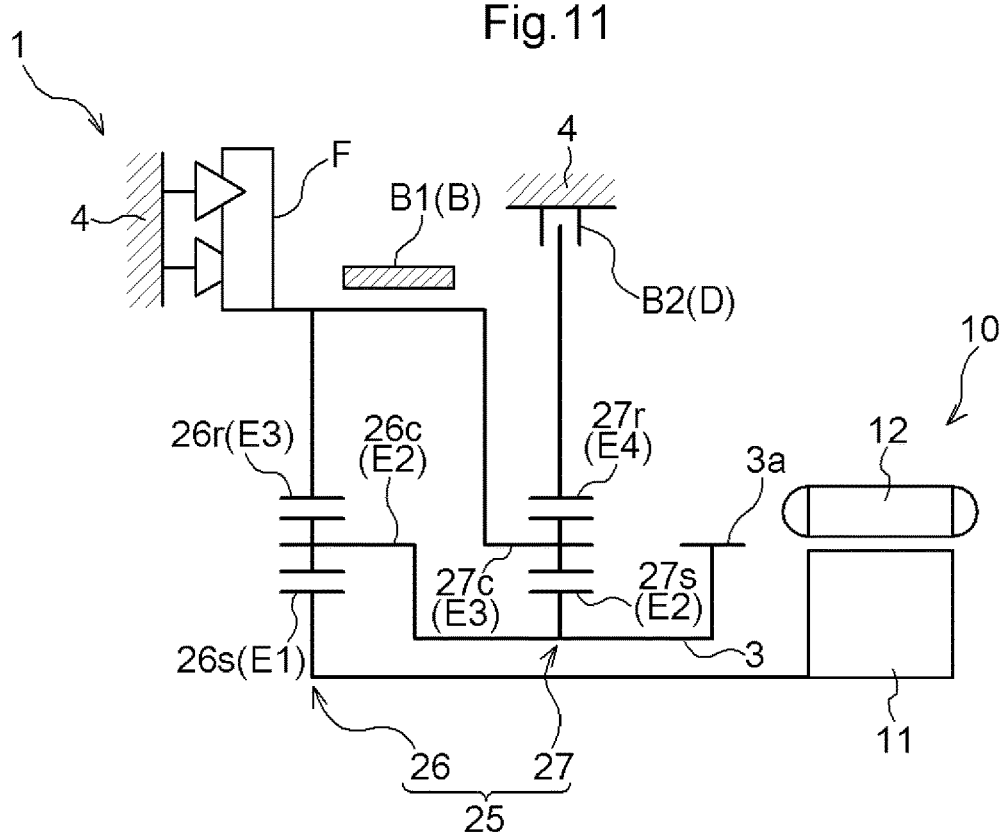
FIG. 11 is a skeleton diagram of a vehicle drive system according to a modification.
Figure 12:
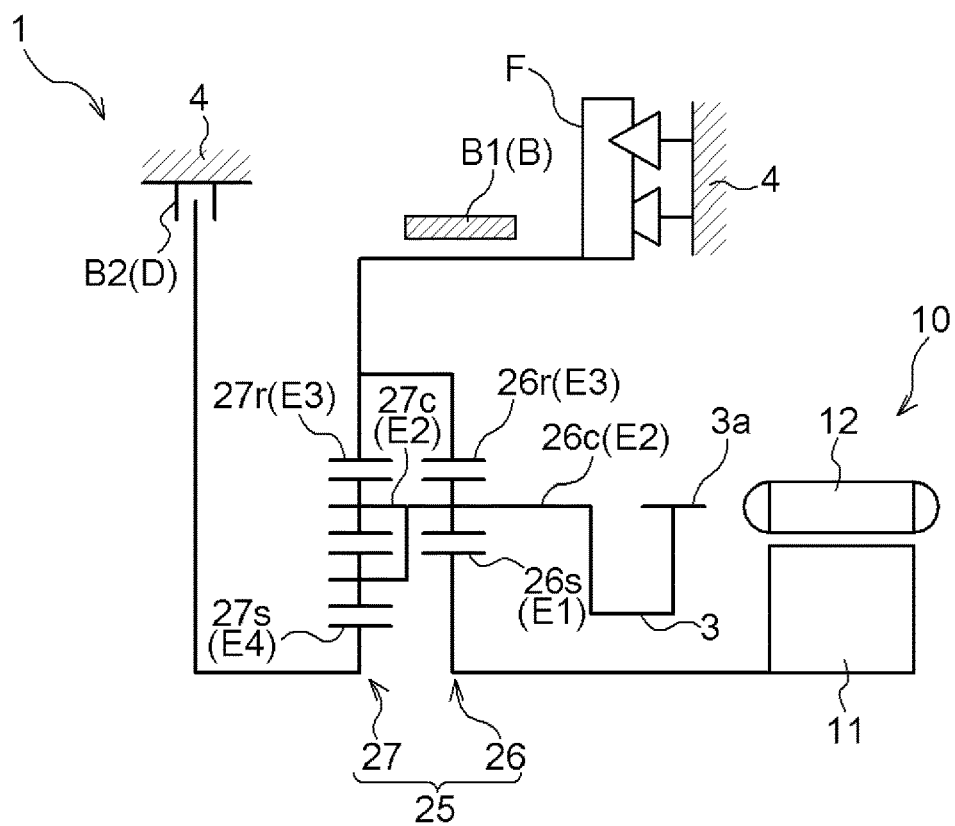
FIG. 12 is a skeleton diagram of a vehicle drive system according to another modification.

(7) According to the example structure described in the first and second embodiments, the first differential gear device 21 and the second differential gear device 22 are each structured with one single-pinion-type planetary gear mechanism. However, the embodiments are not limited to this structure, and at least one of the first differential gear device 21 and the second differential gear device 22 may be structured with one double-pinion-type planetary gear mechanism. According to the example structure described in the third embodiment, the differential gear device 25 is structured as a combination device made by combining the first planetary gear mechanism 26 and the second planetary gear mechanism 27. However, the embodiment is not limited to this structure, and the differential gear device 25 may be structured with, for example, a Ravigneaux planetary gear mechanism. Alternatively, for example, the differential gear device 25 may has a structure like the one illustrated in FIG. 11 or FIG. 12, or may have still another structure.

(8) According to the example structure described in the above embodiments, the maximum holding torque from the friction brake B is less than the maximum holding torque from the one-way clutch F. However, the embodiments are not limited to this structure, and, for example, the maximum holding torque from the friction brake B may be greater than or substantially equal to the maximum holding torque from the one-way clutch F.

(9) According to the example structure described in the above embodiments, the friction brake B is structured with a band brake. However, the embodiments are not limited to this structure, and the friction brake B may be structured with, for example, a disc brake, although a self-servo effect will not be provided.

(10) It is noted that, as long as there is no inconsistency, the structure disclosed in any one of the embodiments described above (all the embodiments including other embodiments; the same applies hereinafter) may be used in combination with the structure disclosed in any other of the embodiments. As for other structures, the embodiments disclosed in this description should be considered in all aspects as illustrative, and therefore various modifications that fall within the spirit of the present disclosure are possible as appropriate.

SUMMARY OF THE EMBODIMENTS

In summary, a vehicle drive system according to the present disclosure preferably includes the following structures.

A vehicle drive system (1) includes the following: a rotating electric machine (10); an output member (3) drivingly coupled to a wheel (2); a differential gear device (21) provided in a power transmission path between the rotating electric machine (10) and the output member (3), the differential gear device (21) including at least a first rotating element (E1) drivingly coupled to the rotating electric machine (10), a second rotating element (E2) drivingly coupled to the output member (3), and a third rotating element (E3) that is selectively fixed by a one-way clutch (F) to a non-rotating member (4) and that is selectively fixed by a friction brake (B) to the non-rotating member (4); and an engagement device (D) that, when engaged, brings the differential gear device (21) into a state different from a state that is created by fixation of the third rotating element (E3). A reaction force torque that acts on the third rotating element (E3) when the rotating electric machine (10) outputs a positive torque (T1) in a forward powering direction is defined as a first reaction force torque (TR1). A reaction force torque that acts on the third rotating element (E3) when the rotating electric machine (10) outputs a negative torque (T2) opposite in direction to the positive torque (T1) is defined as a second reaction force torque (TR2). The one-way clutch (F) is structured to be switchable at least between a one-way restriction state in which rotation of the third rotating element (E3) in one direction is restricted and a rotation restriction state in which rotation of the third rotating element (E3) in both directions is restricted. In the one-way restriction state, the one-way clutch (F) restricts rotation of the third rotating element (E3) in a rotation direction caused by the first reaction force torque (TR1) while allowing rotation of the third rotating element (E3) in a rotation direction caused by the second reaction force torque (TR2).

According to this structure, the third rotating element (E3) that is being restricted from rotating by the one-way clutch (F) in the one-way restriction state is capable of receiving the first reaction force torque (TR1) that acts on the third rotating element (E3) when the rotating electric machine (10) outputs the positive torque (T1). Thus, it is possible to establish a forward shift speed (hereinafter referred to as a "first shift speed") where rotation input from the rotating electric machine (10) side to the first rotating element (E1) is output from the second rotating element (E2) to the output member (3) side while the rotational speed is changed at a speed ratio determined by a gear ratio of the differential gear device (21). Further, by engaging the engagement device (D), it is possible to establish a forward shift speed (hereinafter referred to as a "second shift speed") where rotation input from the rotating electric machine (10) side to the first rotating element (E1) is output from the second rotating element (E2) to the output member (3) side at a different rotational speed from a rotational speed when the first shift speed is established. That is, it is possible to selectively establish the first shift speed and the second shift speed, when moving a vehicle forward by transferring the positive torque (T1) of the rotating electric machine (10) to the wheel (2).

It is noted that the one-way clutch (F) in the one-way restriction state is automatically engaged by the first reaction force torque (TR1) that acts on the third rotating element (E3) in accordance with the positive torque (T1) of the rotating electric machine (10). This eliminates the need of performing special control, when starting the vehicle by causing the rotating electric machine (10) to output the positive torque (T1), thus simplifying control. Further, torque from the rotating electric machine (10) becomes transferrable to the wheel (2) at the same time as the one-way clutch (F) in the one-way restriction state is automatically engaged. Thus, it is possible to provide the vehicle drive system (1) that is capable of performing simplified control necessary to start the vehicle using torque of the rotating electric machine (10) and that is capable of quickly making the torque from the rotating electric machine (10) transferable to the wheel (2) when the vehicle starts.

Further, the third rotating element (E3) that is being restricted from rotating by the one-way clutch (F) in the rotation restriction state is capable of receiving the second reaction force torque (TR2) that acts on the third rotating element (E3) when the rotating electric machine (10) outputs the negative torque (T2). Thus, by switching the one-way clutch (F) to the rotation restriction state during forward movement in the first shift speed, it is possible to transfer the negative torque (T2) output from the rotating electric machine (10) to the wheel (2), i.e., to cause the rotating electric machine (10) to generate electric power, while leaving the first shift speed established.

Further, since the friction brake (B) that selectively fixes the third rotating element (E3) to the non-rotating member (4) is included, it is possible to reduce the rotational speed of the third rotating element (E3) against the second reaction force torque (TR2) by engaging the friction brake (B) and disengaging the engagement device (D) from a situation where the rotating electric machine (10) outputs the negative torque (T2) to generate electric power in the second shift speed. Further, by bringing the one-way clutch (F) into the rotation restriction state after the rotational speed of the third rotating element (E3) becomes zero, it is possible to establish the first shift speed while leaving the rotating electric machine (10) generating electric power. That is, it is possible to make a shift-speed change from the second shift speed to the first shift speed during regenerative movement.

A vehicle drive system (1) includes the following: a rotating electric machine (10); an output member (3) drivingly coupled to a wheel (2); a differential gear device (21) provided in a power transmission path between the rotating electric machine (10) and the output member (3), the differential gear device (21) including at least a first rotating element (E1) drivingly coupled to the rotating electric machine (10), a second rotating element (E2) drivingly coupled to the output member (3), and a third rotating element (E3) that is selectively fixed by a one-way clutch (F) to a non-rotating member (4) and that is selectively fixed by a friction brake (B) to the non-rotating member (4); and a clutch (C) that selectively couples together two of the first rotating element (E1), the second rotating element (E2), and the third rotating element (E3). A reaction force torque that acts on the third rotating element (E3) when the rotating electric machine (10) outputs a positive torque (T1) in a forward powering direction is defined as a first reaction force torque (TR1). A reaction force torque that acts on the third rotating element (E3) when the rotating electric machine (10) outputs a negative torque (T2) opposite in direction to the positive torque (T1) is defined as a second reaction force torque (TR2). The one-way clutch (F) is structured to be switchable at least between a one-way restriction state in which rotation of the third rotating element (E3) in one direction is restricted and a rotation restriction state in which rotation of the third rotating element (E3) in both directions is restricted. In the one-way restriction state, the one-way clutch (F) restricts rotation of the third rotating element (E3) in a rotation direction caused by the first reaction force torque (TR1) while allowing rotation of the third rotating element (E3) in a rotation direction caused by the second reaction force torque (TR2).

According to this structure, the third rotating element (E3) that is being restricted from rotating by the one-way clutch (F) in the one-way restriction state is capable of receiving the first reaction force torque (TR1) that acts on the third rotating element (E3) when the rotating electric machine (10) outputs the positive torque (T1). Thus, it is possible to establish a forward shift speed (hereinafter referred to as a "first shift speed") where rotation input from the rotating electric machine (10) side to the first rotating element (E1) is output from the second rotating element (E2) to the output member (3) side while the rotational speed is changed at a speed ratio determined by a gear ratio of the differential gear device (21). Further, by engaging the clutch (C), it is possible to establish a forward shift speed (hereinafter referred to as a "second shift speed") where rotation input from the rotating electric machine (10) side to the first rotating element (E1) is output from the second rotating element (E2) to the output member (3) side at a different rotational speed from a rotational speed when the first shift speed is established. That is, it is possible to selectively establish the first shift speed and the second shift speed, when moving a vehicle forward by transferring the positive torque (T1) of the rotating electric machine (10) to the wheel (2).

In this case, in the second shift speed established by engaging the clutch (C), the rotation, input from the rotating electric machine (10) side to the first rotating element (E1), can be output from the second rotating element (E2) to the output member (3) side without changing the rotational speed. Thus, it is possible to appropriately handle large driving force as compared to, for example, a configuration in which the second shift speed is an acceleration speed. Or it is possible to handle higher speed rotation as compared to, for example, a configuration in which the two shift speeds (the first shift speed/the second shift speed) are both deceleration speeds.

It is noted that the one-way clutch (F) in the one-way restriction state is automatically engaged by the first reaction force torque (TR1) that acts on the third rotating element (E3) in accordance with the positive torque (T1) of the rotating electric machine (10). This eliminates the need of performing special control, when starting the vehicle by causing the rotating electric machine (10) to output the positive torque (T1), thus simplifying control. Further, torque from the rotating electric machine (10) becomes transferable to the wheel (2) at the same time as the one-way clutch (F) in the one-way restriction state is automatically engaged. Thus, it is possible to provide the vehicle drive system (1) that is capable of performing simplified control necessary to start the vehicle using torque of the rotating electric machine (10) and that is capable of quickly making the torque from the rotating electric machine (10) transferable to the wheel (2) when the vehicle starts.

Further, the third rotating element (E3) that is being restricted from rotating by the one-way clutch (F) in the rotation restriction state is capable of receiving the second reaction force torque (TR2) that acts on the third rotating element (E3) when the rotating electric machine (10) outputs the negative torque (T2). Thus, by switching the one-way clutch (F) to the rotation restriction state during forward movement in the first shift speed, it is possible to transfer the negative torque (T2) output from the rotating electric machine (10) to the wheel (2), i.e., to cause the rotating electric machine (10) to generate electric power, while leaving the first shift speed established.

Further, since the friction brake (B) that selectively fixes the third rotating element (E3) to the non-rotating member (4) is included, it is possible to reduce the rotational speed of the third rotating element (E3) against the second reaction force torque (TR2) by engaging the friction brake (B) and disengaging the clutch (C) from a situation where the rotating electric machine (10) outputs the negative torque (T2) to generate electric power in the second shift speed. Further, by bringing the one-way clutch (F) into the rotation restriction state after the rotational speed of the third rotating element (E3) becomes zero, it is possible to establish the first shift speed while leaving the rotating electric machine (10) generating electric power. That is, it is possible to make a shift-speed change from the second shift speed to the first shift speed during regenerative movement.

In one aspect, it is preferable that the first rotating element (E1), the second rotating element (E2), and the third rotating element (E3) be in order of rotational speed.

This structure allows the first shift speed to have a speed ratio (a speed reduction ratio) greater than that of the second shift speed. Specifically, this allows the first shift speed to serve as a deceleration speed where rotation input from the rotating electric machine (10) side to the first rotating element (E1) is output from the second rotating element (E2) to the output member (3) side while the rotational speed is reduced at a speed ratio determined by a gear ratio of the differential gear device (21). Thus, when the vehicle speed is low, the first shift speed may be established to secure large driving force for the wheel (2), and when the vehicle speed is high, the second shift speed may be established to reduce the likelihood that the rotational speed of the rotating electric machine (10) will become too high. That is, it is possible to reduce the total system size using the rotating electric machine (10) that is small in size while securing necessary driving force. Therefore, it is possible to provide the vehicle drive system (1) that is capable of securing necessary driving force despite its compact size.

In one aspect, it is preferable that when the differential gear device is defined as a first differential gear device (21), the vehicle drive system (1) include a second differential gear device (22). The second differential gear device (22) is disposed coaxially with the first differential gear device (21) in a power transmission path between the first differential gear device (21) and the output member (3). The second differential gear device (22) may preferably include, in order of rotational speed, a fourth rotating element (E4) drivingly coupled to the second rotating element (E2), a fifth rotating element (E5) drivingly coupled to the output member (3), and a sixth rotating element (E6) fixed to the non-rotating member (4).

Since this structure makes it possible that rotation output from the first differential gear device (21) to the output member (3) side is output to the output member (3) side while the rotational speed is reduced by the second differential gear device (22), the size of the rotating electric machine (10) can be reduced. Further, since the second differential gear device (22) is disposed coaxially with the first differential gear device (21), it is possible to arrange the second differential gear device (22) while curbing an increase in the total system size in a direction perpendicular to the axial direction.

In one aspect, it is preferable that the differential gear device (21) be a single-pinion-type planetary gear mechanism including a first ring gear (21r) as the first rotating element (E1), a first carrier (21c) as the second rotating element (E2), and a first sun gear (21s) as the third rotating element (E3), that the second differential gear device (22) be a single-pinion-type planetary gear mechanism including a second sun gear (22s) as the fourth rotating element (E4), a second carrier (22c) as the fifth rotating element (E5), and a second ring gear (22r) as the sixth rotating element (E6), and that the clutch (C) selectively couple the first sun gear (21s) and the first carrier (21c) together.

This structure makes it possible to reduce the size of the rotating electric machine (10) and to curb an increase in the total system size. Thus, it is possible to provide the vehicle drive system (1) that is capable of securing necessary driving force despite its compact size.

In one aspect, it is preferable that the vehicle drive system (1) include a control device (30) that controls an engagement state of each of the clutch (C) and the friction brake (B) and that controls a switching state of the one-way clutch (F) between the one-way restriction state and the rotation restriction state. From a situation where the rotating electric machine (10) outputs the negative torque (T2) with the clutch (C) engaged, the control device (30) may preferably bring the friction brake (B) into slip engagement while disengaging the clutch (C) so as to reduce the rotational speed of the third rotating element (E3), and then bring the one-way clutch (F) into the rotation restriction state when the rotational speed of the third rotating element (E3) becomes zero.

This structure enables a smooth shift-speed change from the second shift speed to the first shift speed during regenerative movement.

In one aspect, it is preferable that after bringing the one-way clutch (F) into the rotation restriction state, the control device (30) maintain the rotation restriction state during the time that the rotating electric machine (10) outputs the negative torque (T2).

According to this structure, the one-way clutch (F) is maintained in the rotation restriction state so as to allow disengagement of the friction brake (B) in the first shift speed. This eliminates the need of driving an actuator of the friction brake (B) to maintain the first shift speed, thus making it possible to improve energy efficiency of the vehicle drive system (1).

A vehicle drive system (1) includes the following: a rotating electric machine (10); an output member (3) drivingly coupled to a wheel (2); and a differential gear device (21) provided in a power transmission path between the rotating electric machine (10) and the output member (3), the differential gear device (21) including a first rotating element (E1) drivingly coupled to the rotating electric machine (10), a second rotating element (E2) drivingly coupled to the output member (3), a third rotating element (E3) that is selectively fixed by a one-way clutch (F) to a non-rotating member (4) and that is selectively fixed by a friction brake (B) to the non-rotating member (4), and a fourth rotating element (E4) that is selectively fixed by a second brake (B2) other than the friction brake (B1) to the non-rotating member (4). A reaction force torque that acts on the third rotating element (E3) when the rotating electric machine (10) outputs a positive torque (T1) in a forward powering direction is defined as a first reaction force torque (TR1). A reaction force torque that acts on the third rotating element (E3) when the rotating electric machine (10) outputs a negative torque (T2) opposite in direction to the positive torque (T1) is defined as a second reaction force torque (TR2). The one-way clutch (F) is structured to be switchable at least between a one-way restriction state in which rotation of the third rotating element (E3) in one direction is restricted and a rotation restriction state in which rotation of the third rotating element (E3) in both directions is restricted. In the one-way restriction state, the one-way clutch (F) restricts rotation of the third rotating element (E3) in a rotation direction caused by the first reaction force torque (TR1) while allowing rotation of the third rotating element (E3) in a rotation direction caused by the second reaction force torque (TR2).

According to this structure, the third rotating element (E3) that is being restricted from rotating by the one-way clutch (F) in the one-way restriction state is capable of receiving the first reaction force torque (TR1) that acts on the third rotating element (E3) when the rotating electric machine (10) outputs the positive torque (T1). Thus, it is possible to establish a forward shift speed (hereinafter referred to as a "first shift speed") where rotation input from the rotating electric machine (10) side to the first rotating element (E1) is output from the second rotating element (E2) to the output member (3) side while the rotational speed is changed at a speed ratio determined by a gear ratio of the differential gear device (21). Further, by engaging the second brake (B2), it is possible to establish a forward shift speed (hereinafter referred to as a "second shift speed") where rotation input from the rotating electric machine (10) side to the first rotating element (E1) is output from the second rotating element (E2) to the output member (3) side at a different rotational speed from a rotational speed when the first shift speed is established. That is, it is possible to selectively establish the first shift speed and the second shift speed, when moving a vehicle forward by transferring the positive torque (T1) of the rotating electric machine (10) to the wheel (2).

In this case, in the second shift speed established by engaging the second brake (B2), rotation input from the rotating electric machine (10) side to the first rotating element (E1) can be output from the second rotating element (E2) to the output member (3) side while the rotational speed is reduced, for example, to a value that is different from a value when the first shift speed is established. Thus, for example, it is easy to achieve a compact structure where the two shift speeds (the first shift speed/the second shift speed) are both deceleration speeds.

It is noted that the one-way clutch (F) in the one-way restriction state is automatically engaged by the first reaction force torque (TR1) that acts on the third rotating element (E3) in accordance with the positive torque (T1) of the rotating electric machine (10). This eliminates the need of performing special control, when starting the vehicle by causing the rotating electric machine (10) to output the positive torque (T1), thus simplifying control. Further, torque from the rotating electric machine (10) becomes transferable to the wheel (2) at the same time as the one-way clutch (F) in the one-way restriction state is automatically engaged. Thus, it is possible to provide the vehicle drive system (1) that is capable of performing simplified control necessary to start the vehicle using torque of the rotating electric machine (10) and that is capable of quickly making the torque from the rotating electric machine (10) transferable to the wheel (2) when the vehicle starts.

Further, the third rotating element (E3) that is being restricted from rotating by the one-way clutch (F) in the rotation restriction state is capable of receiving the second reaction force torque (TR2) that acts on the third rotating element (E3) when the rotating electric machine (10) outputs the negative torque (T2). Thus, by switching the one-way clutch (F) to the rotation restriction state during forward movement in the first shift speed, it is possible to transfer the negative torque (T2) from the rotating electric machine (10) to the wheel (2), i.e., to cause the rotating electric machine (10) to generate electric power, while leaving the first shift speed established.

Further, since the friction brake (B) that selectively fixes the third rotating element (E3) to the non-rotating member (4) is included, it is possible to reduce the rotational speed of the third rotating element (E3) against the second reaction force torque (TR2) by engaging the friction brake (B) and disengaging the second brake (B2) from a situation where the rotating electric machine (10) outputs the negative torque (T2) to generate electric power in the second shift speed. Further, by bringing the one-way clutch (F) into the rotation restriction state after the rotational speed of the third rotating element (E3) becomes zero, it is possible to establish the first shift speed while leaving the rotating electric machine (10) generating electric power. That is, it is possible to make a shift-speed change from the second shift speed to the first shift speed during regenerative movement.

In one aspect, the first rotating element (E1), the second rotating element (E2), the third rotating element (E3), and the fourth rotating element (E4) may preferably be in order of rotational speed.

According to this structure, in the second shift speed established by engaging the second brake (B2), rotation input from the rotating electric machine (10) side to the first rotating element (E1) can be output from the second rotating element (E2) to the output member (3) side while the rotational speed is reduced to a value that is higher than a rotational speed when the first shift speed is established. Since the two shift speeds (the first shift speed/the second shift speed) are both deceleration speeds, it is possible to appropriately handle larger driving force using the rotating electric machine (10) that is small in size.

In one aspect, the differential gear device (25) may preferably include a single-pinion-type first planetary gear mechanism (26) and a double-pinion-type second planetary gear mechanism (27). The first planetary gear mechanism (26) may preferably include a first sun gear (26s), a first carrier (26c), and a first ring gear (26r). The second planetary gear mechanism (27) may preferably include a second sun gear (27s), a second carrier (27c), and a second ring gear (27r). The differential gear device (27) may preferably be a combination device structured by coupling the first ring gear (26r) and the second ring gear (27r) together and by coupling the first carrier (26c) and the second sun gear (27s) together. The first rotating element (E1) may preferably be the first sun gear (26s). The second rotating element (E2) may preferably be the first carrier (26c) and the second sun gear (27s) that rotate together as a unit. The third rotating element (E3) may preferably be the first ring gear (26r) and the second ring gear (27r) that rotate together as a unit. The fourth rotating element (E4) may preferably be the second carrier (27c).

According to this structure, since the two shift speeds (the first shift speed/the second shift speed) are both deceleration speeds, it is possible to appropriately handle larger driving force using the rotating electric machine (10) that is small in size. Thus, it is possible to provide the vehicle drive system (1) that is capable of securing necessary driving force despite its compact size.

In one aspect, the vehicle drive system (1) may preferably include a control device (30) that controls an engagement state of each of the friction brake (B) and the second brake (B2) and that controls a switching state of the one-way clutch (F) between the one-way restriction state and the rotation restriction state. From a situation where the rotating electric machine (10) outputs the negative torque (T2) with the second brake (B2) engaged, the control device (30) may preferably bring the friction brake (B) into slip engagement while disengaging the second brake (B2) so as to reduce the rotational speed of the third rotating element (E3), and then bring the one-way clutch (F) into the rotation restriction state when the rotational speed of the third rotating element (E3) becomes zero.

This structure enables a smooth shift-speed change from the second shift speed to the first shift speed, when the vehicle is moving while regenerating energy.

In one aspect, it is preferable that after bringing the one-way clutch (F) into the rotation restriction state, the control device (30) maintain the rotation restriction state during the time that the rotating electric machine (10) outputs the negative torque (T2).

According to this structure, the one-way clutch (F) is maintained in the rotation restriction state so as to allow disengagement of the friction brake (B) in the first shift speed. This eliminates the need of driving an actuator of the friction brake (B) to maintain the first shift speed, thus making it possible to improve energy efficiency of the vehicle drive system (1).

In one aspect, it is preferable that the maximum holding torque of the friction brake (B) be less than the maximum holding torque of the one-way clutch (F).

This structure allows the friction brake (B) to have a relatively small size and thus allows a reduction in the total system size while enabling a shift-speed change from the second shift speed to the first shift speed during regenerative movement.

In one aspect, it is preferable that the friction brake (B) be structured with a band brake and be provided in such a manner as to produce a self-servo effect in a direction that reduces the speed of rotation of the third rotating element (E3) in a forward direction.

This structure helps engagement members of the band brake that structures the friction brake (B) to be brought in contact with and pressed against each other by a frictional force generated at the band brake, thus allowing the friction brake (B) to have a relatively small size. Therefore, it is possible to reduce the total system size while enabling a shift-speed change from the second shift speed to the first shift speed during regenerative movement.

Achieving at least one of the effects described above fulfils the requirements of a vehicle drive system according to the present disclosure.

The invention claimed is:

1. A vehicle drive system comprising:
   a rotating electric machine;
   an output drivingly coupled to a wheel;
   a differential gear device provided in a power transmission path between the rotating electric machine and the output, the differential gear device including at least a first rotating element drivingly coupled to the rotating electric machine, a second rotating element drivingly coupled to the output, and a third rotating element that is selectively fixed by a one-way clutch to a non-rotating member and that is selectively fixed by a friction brake to the non-rotating member; and
   a clutch that selectively couples together two of the first rotating element, the second rotating element, and the third rotating element, wherein
      a reaction force torque that acts on the third rotating element when the rotating electric machine outputs a positive torque in a forward powering direction is defined as a first reaction force torque,
      a reaction force torque that acts on the third rotating element when the rotating electric machine outputs a negative torque opposite in direction to the positive torque is defined as a second reaction force torque,
      the one-way clutch is structured to be switchable at least between a one-way restriction state in which rotation of the third rotating element in one direction is restricted and a rotation restriction state in which rotation of the third rotating element in both directions is restricted, and
      in the one-way restriction state, the one-way clutch restricts rotation of the third rotating element in a rotation direction caused by the first reaction force torque while allowing rotation of the third rotating element in a rotation direction caused by the second reaction force torque.

2. The vehicle drive system according to claim 1, wherein the first rotating element, the second rotating element, and the third rotating element are in order of rotational speed.

3. The vehicle drive system according to claim 1, further comprising:
   a control device that controls an engagement state of each of the clutch and the friction brake and that controls a switching state of the one-way clutch between the one-way restriction state and the rotation restriction state, wherein
   from a situation where the rotating electric machine outputs the negative torque with the clutch engaged, the control device brings the friction brake into slip engagement while disengaging the clutch so as to reduce a rotational speed of the third rotating element, and then brings the one-way clutch into the rotation restriction state when the rotational speed of the third rotating element becomes zero.

4. The vehicle drive system according to claim 1, wherein a maximum holding torque of the friction brake is less than a maximum holding torque of the one-way clutch.

5. The vehicle drive system according to claim 1, wherein the friction brake is structured with a band brake and is provided in such a manner as to produce a self-servo effect in a direction that reduces a speed of rotation of the third rotating element in a forward direction.

6. The vehicle drive system according to claim 2, wherein the differential gear device is defined as a first differential gear device,
   the vehicle drive system further comprising: a second differential gear device that is disposed coaxially with the first differential gear device in a power transmission path between the first differential gear device and the output, the second differential gear device including, in order of rotational speed, a fourth rotating element drivingly coupled to the second rotating element, a fifth rotating element drivingly coupled to the output, and a sixth rotating element fixed to the non-rotating member.

7. The vehicle drive system according to claim 2, further comprising:
   a control device that controls an engagement state of each of the clutch and the friction brake and that controls a switching state of the one-way clutch between the one-way restriction state and the rotation restriction state, wherein
   from a situation where the rotating electric machine outputs the negative torque with the clutch engaged, the control device brings the friction brake into slip engagement while disengaging the clutch so as to reduce a rotational speed of the third rotating element, and then brings the one-way clutch into the rotation restriction state when the rotational speed of the third rotating element becomes zero.

8. The vehicle drive system according to claim 2, wherein a maximum holding torque of the friction brake is less than a maximum holding torque of the one-way clutch.

9. The vehicle drive system according to claim 2, wherein the friction brake is structured with a band brake and is provided in such a manner as to produce a self-servo effect in a direction that reduces a speed of rotation of the third rotating element in a forward direction.

10. The vehicle drive system according to claim 3, wherein
   after bringing the one-way clutch into the rotation restriction state, the control device maintains the rotation restriction state during a time that the rotating electric machine outputs the negative torque.

11. The vehicle drive system according to claim 6, wherein
   the first differential gear device is a single-pinion-type planetary gear mechanism including a first ring gear as the first rotating element, a first carrier as the second rotating element, and a first sun gear as the third rotating element, the second differential gear device is a single-pinion-type planetary gear mechanism including a second sun gear as the fourth rotating element, a second carrier as the fifth rotating element, and a second ring gear as the sixth rotating element, and the clutch selectively couples the first sun gear and the first carrier together.

12. A vehicle drive system comprising:

a rotating electric machine;

an output drivingly coupled to a wheel; and a differential gear device provided in a power transmission path between the rotating electric machine and the output, the differential gear device including a first rotating element drivingly coupled to the rotating electric machine, a second rotating element drivingly coupled to the output, a third rotating element that is selectively fixed by a one-way clutch to a non-rotating member and that is selectively fixed by a friction brake to the non-rotating member, and a fourth rotating element that is selectively fixed by a second brake other than the friction brake to the non-rotating member, wherein a reaction force torque that acts on the third rotating element when the rotating electric machine outputs a positive torque in a forward powering direction is defined as a first reaction force torque, a reaction force torque that acts on the third rotating element when the rotating electric machine outputs a negative torque opposite in direction to the positive torque is defined as a second reaction force torque, the one-way clutch is structured to be switchable at least between a one-way restriction state in which rotation of the third rotating element in one direction is restricted and a rotation restriction state in which rotation of the third rotating element in both directions is restricted, and in the one-way restriction state, the one-way clutch restricts rotation of the third rotating element in a rotation direction caused by the first reaction force torque while allowing rotation of the third rotating element in a rotation direction caused by the second reaction force torque.

13. The vehicle drive system according to claim 12, wherein the first rotating element, the second rotating element, the third rotating element, and the fourth rotating element are in order of rotational speed.

14. The vehicle drive system according to claim 12, further comprising:

a control device that controls an engagement state of each of the friction brake and the second brake and that controls a switching state of the one-way clutch between the one-way restriction state and the rotation restriction state, wherein from a situation where the rotating electric machine outputs the negative torque with the second brake engaged, the control device brings the friction brake into slip engagement while disengaging the second brake so as to reduce a rotational speed of the third rotating element, and then brings the one-way clutch into the rotation restriction state when the rotational speed of the third rotating element becomes zero.

15. The vehicle drive system according to claim 12, wherein a maximum holding torque of the friction brake is less than a maximum holding torque of the one-way clutch.

16. The vehicle drive system according to claim 12, wherein the friction brake is structured with a band brake and is provided in such a manner as to produce a self-servo effect in a direction that reduces a speed of rotation of the third rotating element in a forward direction.

17. The vehicle drive system according to claim 13, wherein the differential gear device includes a single-pinion-type first planetary gear mechanism and a double-pinion-type second planetary gear mechanism, the first planetary gear mechanism including a first sun gear, a first carrier, and a first ring gear, the second planetary gear mechanism including a second sun gear, a second carrier, and a second ring gear, the differential gear device is a combination device structured by coupling the first ring gear and the second ring gear together and by coupling the first carrier and the second sun gear together, the first rotating element is the first sun gear, the second rotating element is the first carrier and the second sun gear that rotate together as a unit, the third rotating element is the first ring gear and the second ring gear that rotate together as a unit, and the fourth rotating element is the second carrier.

18. The vehicle drive system according to claim 13, further comprising:

a control device that controls an engagement state of each of the friction brake and the second brake and that controls a switching state of the one-way clutch between the one-way restriction state and the rotation restriction state.

19. The vehicle drive system according to claim 13, wherein a maximum holding torque of the friction brake is less than a maximum holding torque of the one-way clutch.

20. The vehicle drive system according to claim 14, wherein after bringing the one-way clutch into the rotation restriction state, the control device maintains the rotation restriction state during a time that the rotating electric machine outputs the negative torque.

* * * * *